(12) United States Patent
Kawasaki

(10) Patent No.: US 8,890,362 B2
(45) Date of Patent: Nov. 18, 2014

(54) SEMICONDUCTOR DEVICE

(75) Inventor: Kenichi Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 792 days.

(21) Appl. No.: 13/036,976

(22) Filed: Feb. 28, 2011

(65) Prior Publication Data

US 2011/0260783 A1 Oct. 27, 2011

(30) Foreign Application Priority Data

Apr. 21, 2010 (JP) ................................. 2010-098025

(51) Int. Cl.
*H02J 1/00* (2006.01)
*G06F 1/32* (2006.01)

(52) U.S. Cl.
CPC ............ *G06F 1/3203* (2013.01); *Y02B 60/1217* (2013.01); *Y02B 60/1285* (2013.01); *G06F 1/324* (2013.01); *Y02B 60/1282* (2013.01); *G06F 1/3296* (2013.01); *G06F 1/3287* (2013.01)
USPC ......................................................... 307/82

(58) Field of Classification Search
USPC ......................................................... 307/82
See application file for complete search history.

(56) References Cited

U.S. PATENT DOCUMENTS

| | | | |
|---|---|---|---|
| 6,801,027 B2 * | 10/2004 | Hann et al. | 323/282 |
| 7,547,994 B2 * | 6/2009 | Cheon | 307/130 |
| 7,609,047 B2 * | 10/2009 | Ravichandran | 323/351 |
| 8,026,636 B2 * | 9/2011 | Oh | 307/31 |
| 2003/0178978 A1 | 9/2003 | Biagi et al. | |
| 2003/0178980 A1 | 9/2003 | Biagi et al. | |
| 2003/0214275 A1 | 11/2003 | Biagi | |
| 2005/0188233 A1 | 8/2005 | Park | |
| 2010/0060078 A1 * | 3/2010 | Shaw | 307/31 |
| 2010/0219687 A1 * | 9/2010 | Oh | 307/39 |

FOREIGN PATENT DOCUMENTS

| | | |
|---|---|---|
| JP | 2001-517332 A | 10/2001 |
| JP | 2004-5670 A | 1/2004 |
| JP | 2005-235223 A | 9/2005 |
| WO | WO 97/12329 A1 | 4/1999 |

OTHER PUBLICATIONS

H. Mair, et al., "A 65-nm Mobile Multimedia Applications Processor with an Adaptive Power Management Scheme to Compensate for Variations", Symposium on VLSI Circuits Digest Technical Papers, Paper 21-5, pp. 224-225, Jun. 2007.

* cited by examiner

*Primary Examiner* — Jared Fureman
*Assistant Examiner* — Duc M Pham
(74) *Attorney, Agent, or Firm* — Arent Fox LLP

(57) ABSTRACT

A semiconductor device includes a plurality of internal circuits, a plurality of low drop output regulators, and a power management unit. The plurality of low drop output regulators are configured to reduce a power source voltage applied from an outside and generate supply voltages which are to be supplied to the plurality of internal circuits. The power management unit is configured to change a voltage value of the power source voltage in accordance with a state of combination of voltage values of the plurality of supply voltages generated by the plurality of low drop output regulators.

14 Claims, 25 Drawing Sheets

```
[EXAMPLE OF LSI TO WHICH DVFS HAS
 NOT YET BEEN APPLIED
 (SUPPLY VOLTAGE FIXED AT 1.2V)]
```

| LOAD MODE | CLOCK FREQUENCY | SUPPLY VOLTAGE |
|---|---|---|
| 3 (HIGH LOAD) | 400MHz | 1.2V |
| 2 (MEDIUM LOAD) | 200MHz | |
| 1 (LOW LOAD) | 100MHz | |
| 0 (NO LOAD) | 0MHz | |

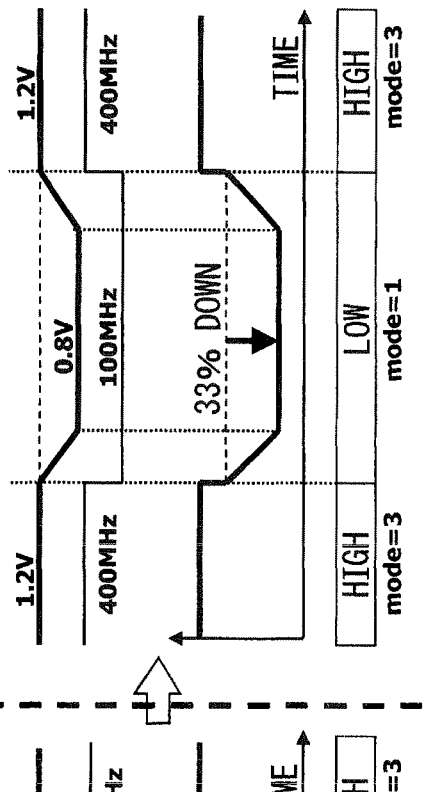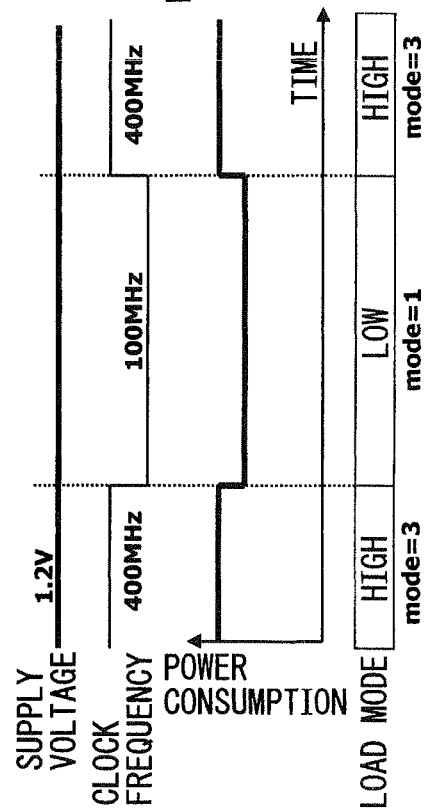

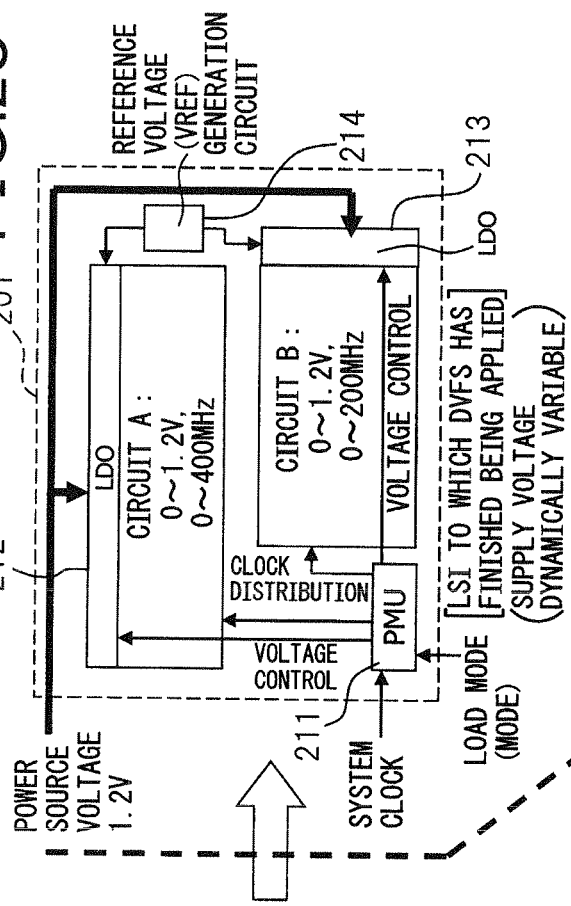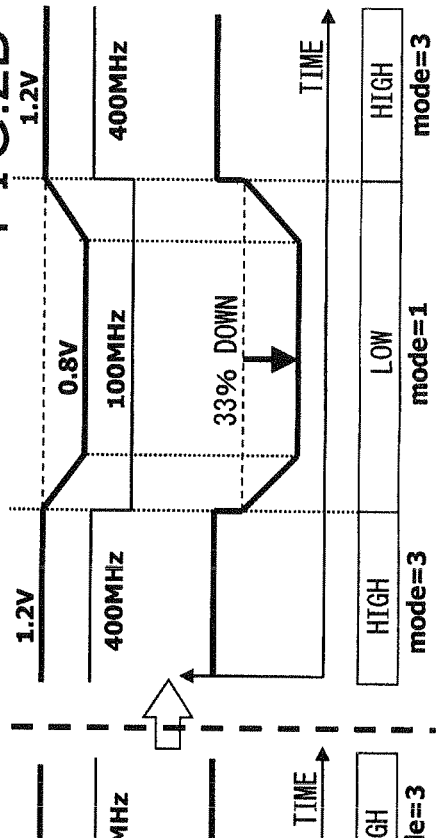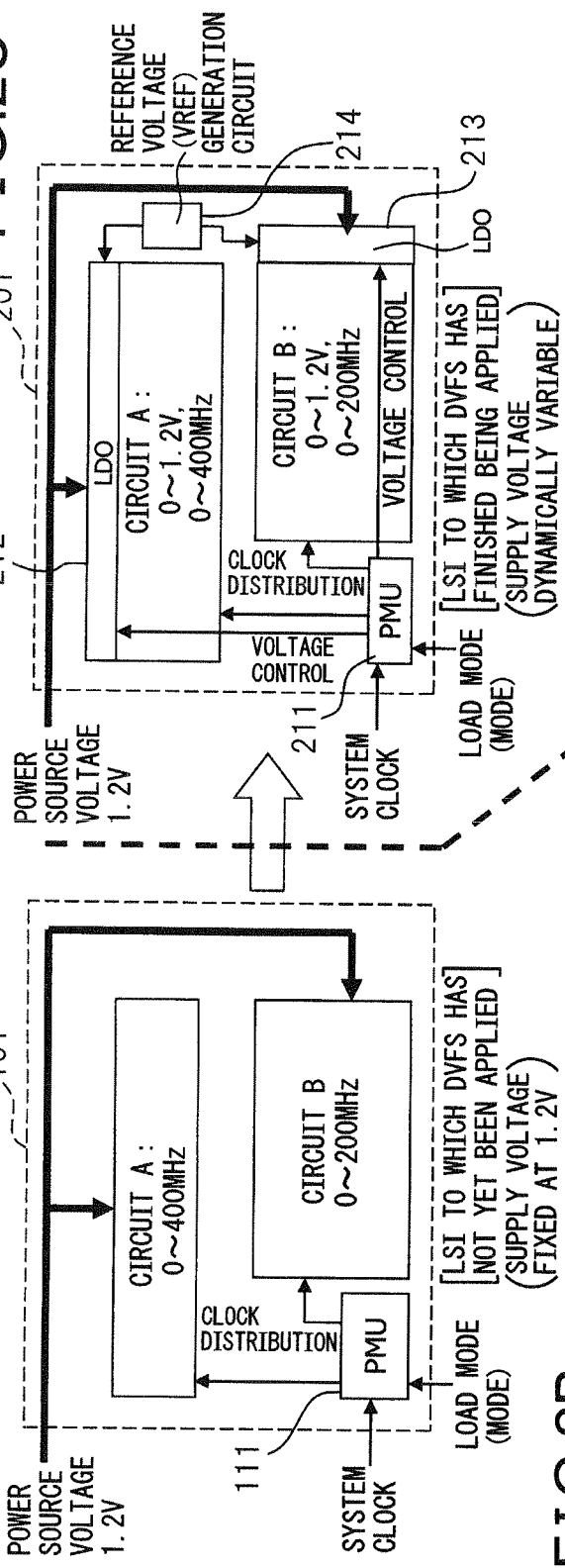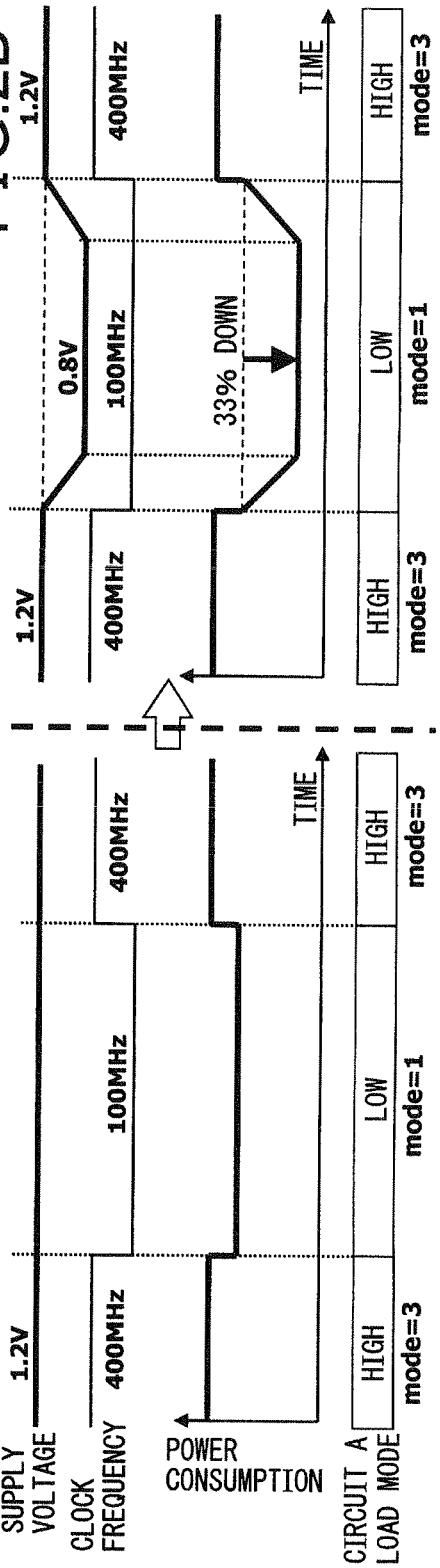

[CONTROL BY EXTERNAL DC-DC CONVERTER]

[CONTROL BY INTERNAL LDO]

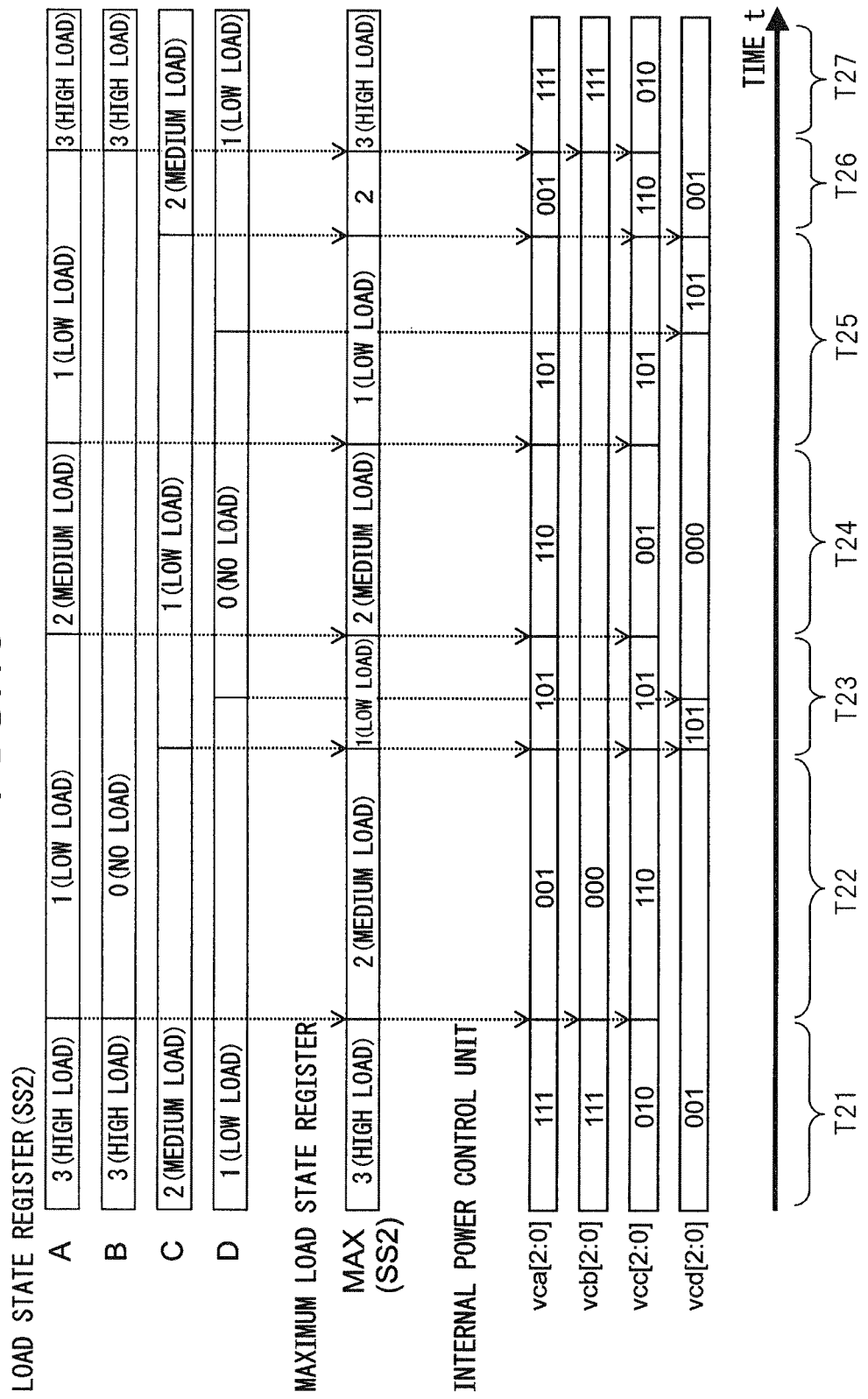

FIG.11A
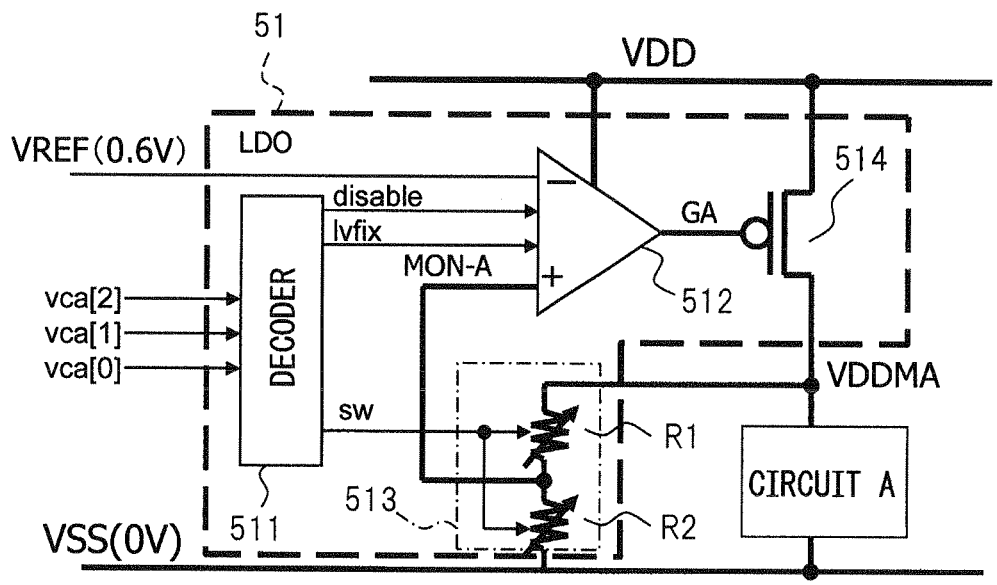
FIG.11B
[OPERATION OF VARIABLE VOLTAGE DIVISION CIRCUIT 513]
<WHEN SETTING VDDMA=0.8V>
(Sw=0)
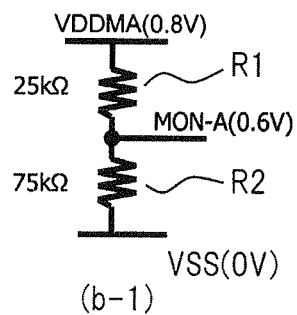
(b-1)
<WHEN SETTING VDDMA=1.0V>
(Sw=1)
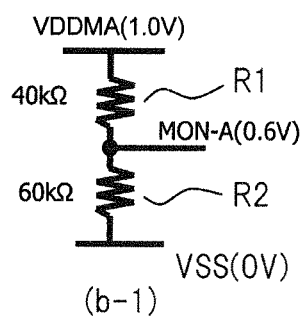
(b-1)

[TRUTH TABLE OF DECODER 511]

| vca[2:0] | MAXIMUM LOAD? | Lmode | SUPPLY VOLTAGE | disable | lvfix | sw |
|---|---|---|---|---|---|---|
| 111 | Yes | 3 (HIGH LOAD) | 1.2V | 1 | 1 | x |
| 110 | Yes | 2 (MEDIUM LOAD) | 1.0V | 1 | 1 | x |
| 101 | Yes | 1 (LOW LOAD) | 0.8V | 1 | 1 | x |
| 100 | Yes | 0 (NO LOAD) | ~0V | 1 | 0 | x |
| 011(※) | No | 3 (HIGH LOAD) | 1.2V | 1 | 1 | x |
| 010 | No | 2 (MEDIUM LOAD) | 1.0V | 0 | x | 1 |
| 001 | No | 1 (LOW LOAD) | 0.8V | 0 | x | 0 |
| 000 | No | 0 (NO LOAD) | ~0V | 1 | 0 | x |

[ON/OFF OPERATION OF VOLTAGE DIVISION RATIO SWITCH]

| sw | sw0 | sw1 | ※VDDMA |
|----|-----|-----|--------|
| 0  | on  | off | 0.8V   |
| 1  | off | on  | 1.0V   |

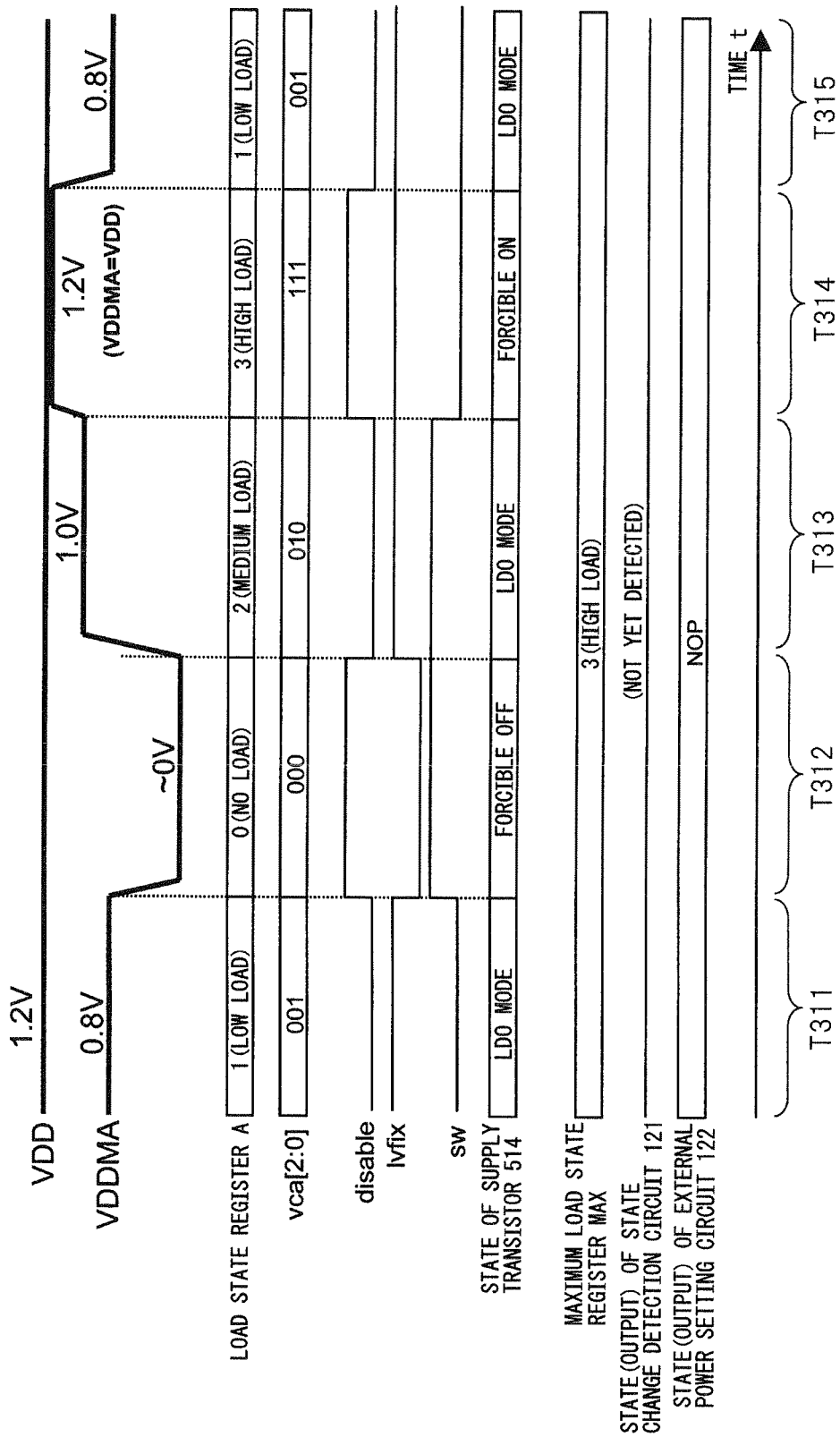

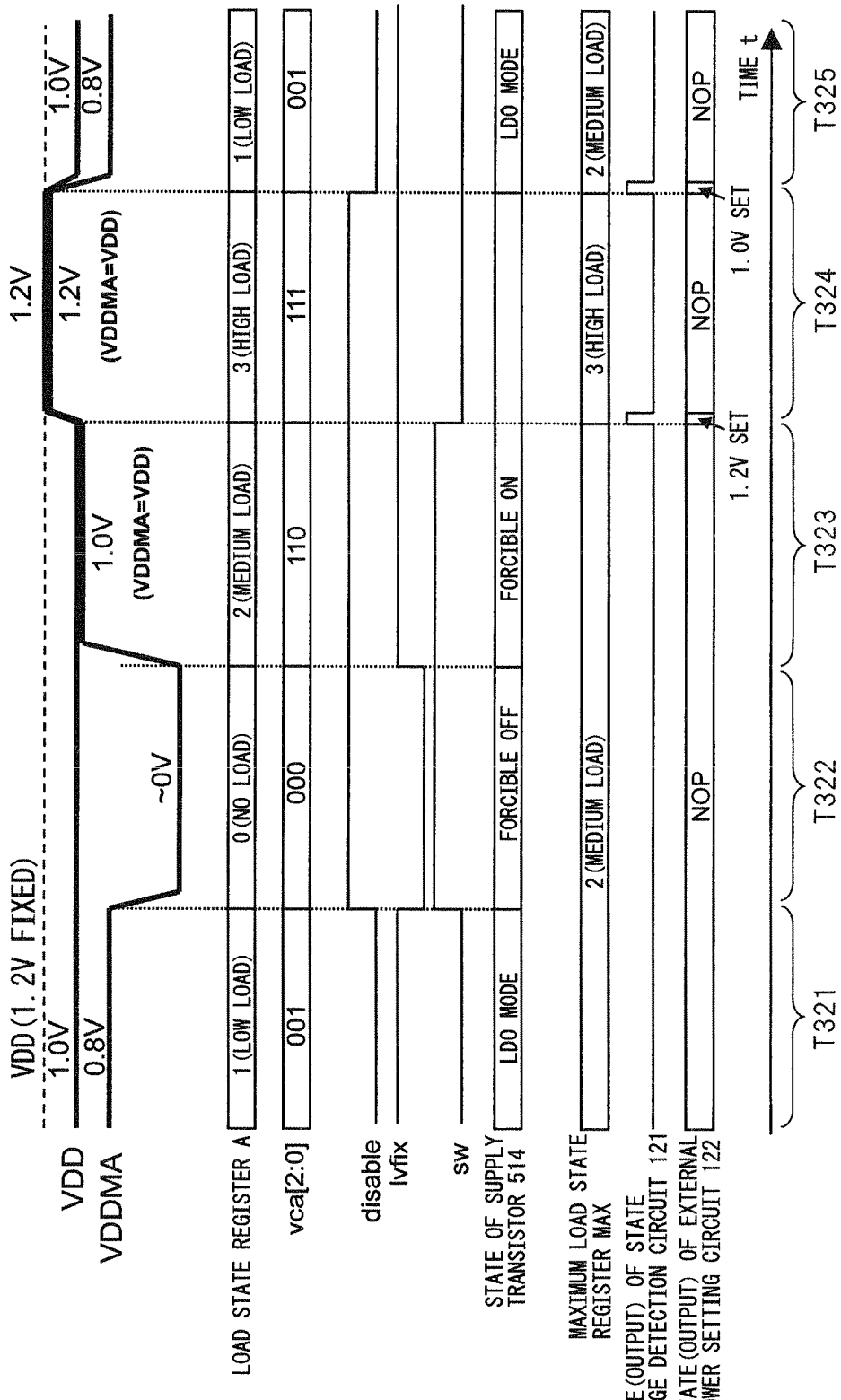

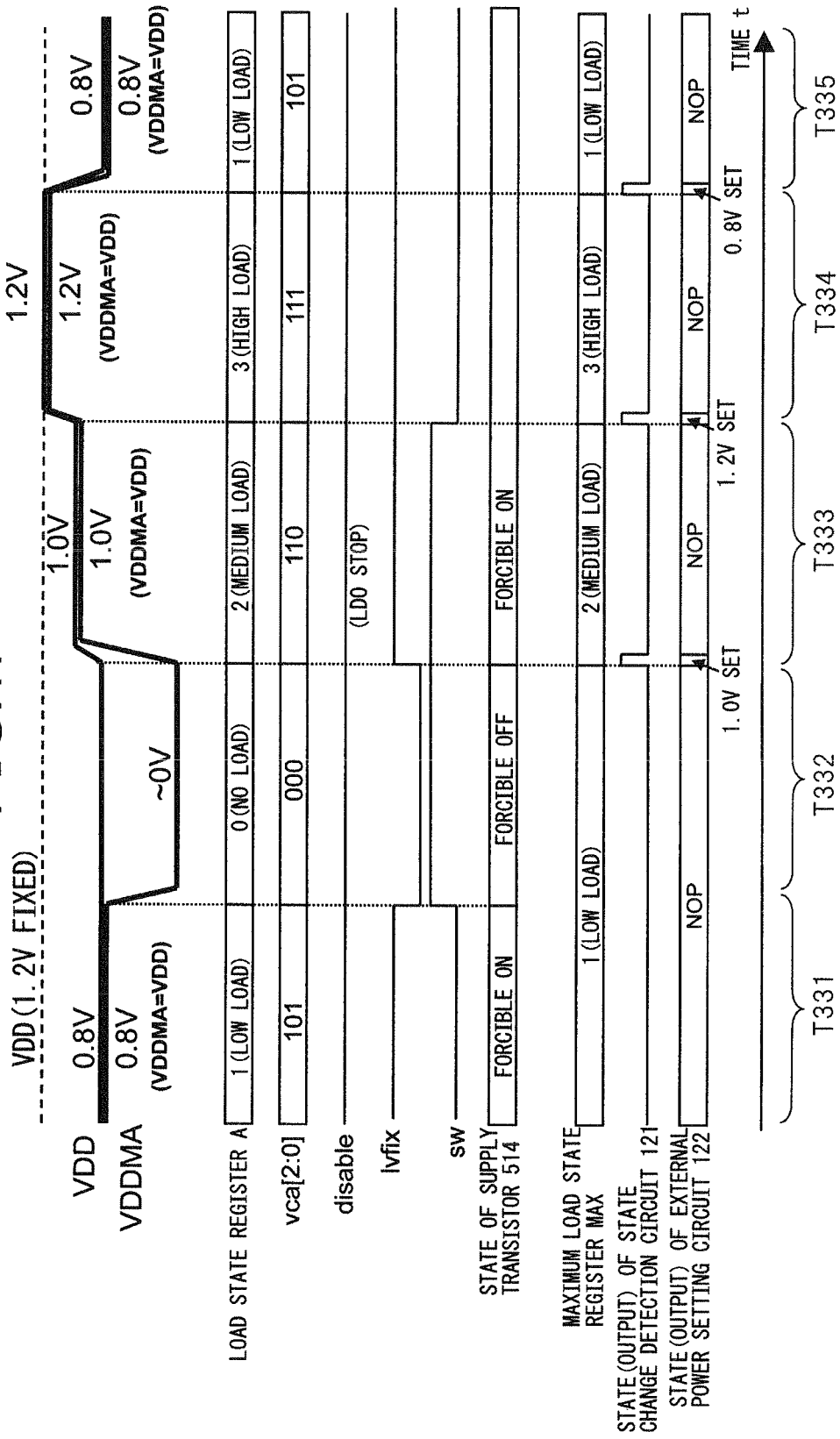

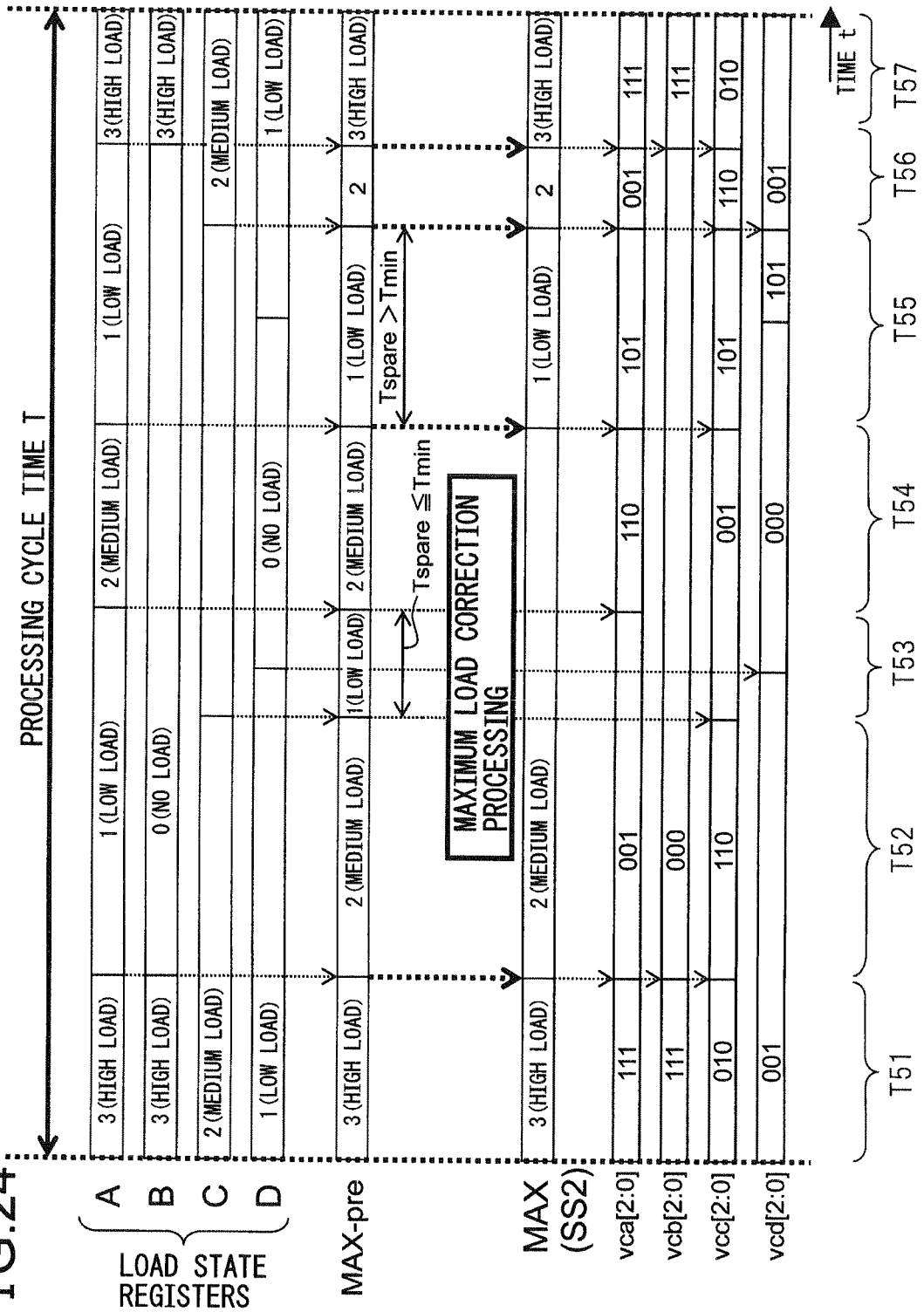

SEMICONDUCTOR DEVICE

CROSS REFERENCE TO RELATED APPLICATION

This application is based upon and claims the benefit of priority of the prior Japanese Patent Application No. 2010-098025, filed on Apr. 21, 2010, the entire contents of which are incorporated herein by reference.

FIELD

The embodiments discussed herein are related to a semiconductor device.

BACKGROUND

Recently, along with the advances in technology for fabrication of semiconductor integrated circuits, circuits have been improved in their degree of integration. Further, the same semiconductor chip (semiconductor device) is now being used to mount a plurality of circuits.

On the other hand, semiconductor devices (LSI) are being widely used for mobile phones and other devices driven by battery power. Along with recent efforts to save energy, therefore, a greater reduction in the power consumption of semiconductor devices has become desired.

Along with such recent demands for reduction of the power consumption of LSIs, the technique of intentionally lowering the operating frequency (clock frequency) for lighter load circuits so as to reduce the power consumption has been utilized.

Further, the technique of lowering the supply voltage to individual circuit blocks in accordance with the load of each circuit block in an LSI, that is, dynamic voltage and frequency scaling (DVFS), is also starting to be employed.

Furthermore, semiconductor devices which mount low drop output regulators (LDO) which supply the plurality of circuits inside the semiconductor devices with voltages which are obtained by lowering the power source voltage which is input from the outside have also been proposed.

As explained above, in recent years, various techniques have been proposed for lowering the power consumption of LSIs. Commensurate effects have been achieved. However, for example, if providing a DC-DC converter for each circuit block so as to control the power source voltage, a large increase in costs will be incurred.

Further, even in LSIs which are designed to control the voltage value of the supply voltage or the clock frequency in accordance with the load of the individual circuit blocks, greater reduction of the power consumption is being sought.

Patent Document 1: Japanese Laid-open Patent Publication No. 2005-235223

Patent Document 2: Japanese Laid-open Patent Publication No. 2004-005670

Patent Document 3: Japanese National Publication of International Patent Application No. 2001-517332

Non-Patent Document 1: H. Mair, et al., "A 65-nm Mobile Multimedia Applications Processor with an Adaptive Power Management Scheme to Compensate for Variations," Symposium on VLSI Circuits Digest Technical Papers, Paper 21-5, pp. 224-225, June, 2007

SUMMARY

According to an aspect of the embodiments, a semiconductor device includes a plurality of internal circuits, a plurality of low drop output regulators, and a power management unit.

The plurality of low drop output regulators are configured to reduce a power source voltage applied from an outside and generate supply voltages which are to be supplied to the plurality of internal circuits.

The power management unit is configured to change a voltage value of the power source voltage in accordance with a state of combination of voltage values of the plurality of supply voltages generated by the plurality of low drop output regulators.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 1A, FIG. 1B, FIG. 1C and FIG. 1D are diagrams for explaining in brief the technique of DVFS;

FIG. 2A, FIG. 2B, FIG. 2C and FIG. 2D are diagrams for explaining one example of a semiconductor device which realizes DVFS control;

FIG. 10 is a diagram for explaining one example of the operation of a PMU as a whole which is illustrated in FIG. 6 to FIG. 8A and FIG. 8B (part 2);

FIG. 11A and FIG. 11B are diagrams for explaining one example of an LDO in the semiconductor device which is illustrated in FIG. 6;

FIG. 15 is a diagram for explaining one example of a semiconductor device of a second embodiment (part 1);

FIG. 16 is a diagram for explaining one example of the semiconductor device of the second embodiment (part 2);

FIG. 17 is a diagram for explaining one example of the semiconductor device of the second embodiment (part 3);

FIG. 24 is a diagram for explaining one example of the operation of the semiconductor device of the third embodiment (part 2).

DESCRIPTION OF EMBODIMENTS

Figure 3A:
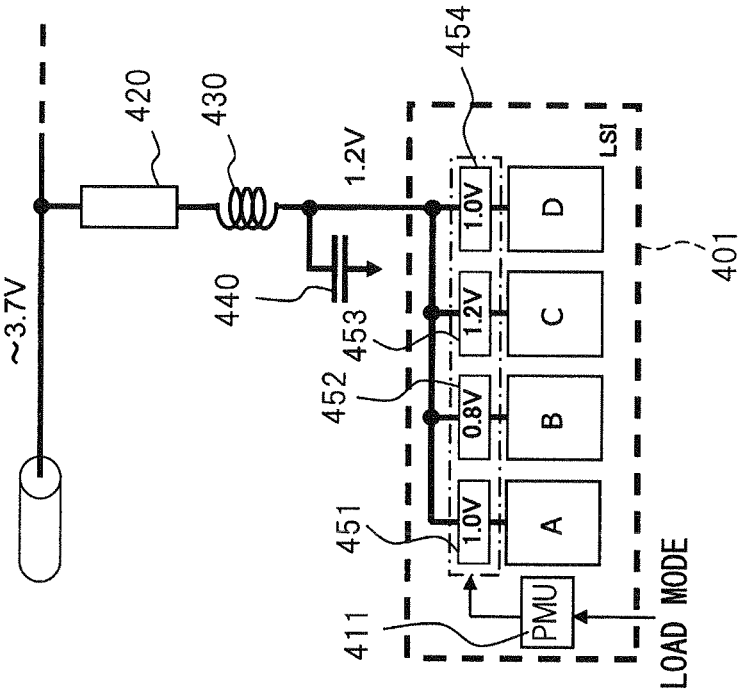
FIG. 3A and FIG. 3B are diagrams for explaining the issues in a semiconductor device which realizes DVFS control.

Before describing in detail the embodiments of a semiconductor device, referring to FIG. 1A to FIG. 3B, the technique of DVFS (dynamic voltage and frequency scaling), a semiconductor device which realizes this DVFS control, and issues in such a semiconductor device will be explained.

FIG. 1A to FIG. 1D are diagrams for explaining in brief the technique of DVFS, wherein FIG. 1A and FIG. 1B illustrate an example of an LSI (semiconductor device) to which DVFS is not yet applied (supply voltage of 1.2V), while FIG. 1C and FIG. 1D illustrate an example of an LSI to which DVFS has finished being applied.

Note that, in an LSI to which DVFS has finished being applied, the supply voltage changes dynamically (for example, changes like 1.2V, 1.0V, 0.8V, and 0V). Further, in both the LSIs of FIG. 1A and FIG. 1B and FIG. 1C and FIG. 1D, when the circuit load becomes lighter, the clock frequency (operating frequency) is lowered to reduce the power consumption.

First, as illustrated in FIG. 1A, in the load modes (modes) of an LSI to which DVFS has not yet been applied, at the time of "3 (high load)", the clock frequency is made 400 MHz, while at the time of "2 (medium load)", the clock frequency is made 200 MHz.

Furthermore, at the time of "1 (low load)", the clock frequency is made 100 MHz, while at the time of "0 (no load)", the clock frequency is made 0 MHz (stop). Note that, the supply voltage is always 1.2V in all modes since DVFS is not yet applied.

On the other hand, as illustrated in FIG. 1C, in the load modes (modes) of an LSI to which DVFS has finished being applied, at the time of "3 (high load)", the clock frequency is made 400 MHz and the supply voltage is made 1.2V.

Further, at the time of "2 (medium load)", the clock frequency is made 200 MHz and the supply voltage is made 1.0V, while at the time of "1 (low load)", the clock frequency is made 100 MHz and the supply voltage is made 0.8V. Note that, at the time of "0 (no load)", the clock frequency is made 0 MHz (stop) and the supply voltage is made as low as 0V.

Specifically, the case where the load mode changes like "high load"→"low load"→"high load" (mode=3→1→3) will be explained.

First, as illustrated in FIG. 1B, in an LSI to which DVFS has not yet been applied, the supply voltage is a constant 1.2V and only the clock frequency changes like 400 MHz→100 MHz→400 MHz, so the power consumption also changes in accordance with the change of the clock frequency.

On the other hand, as illustrated in FIG. 1D, in an LSI to which DVFS has finished being applied, the supply voltage changes like 1.2V→0.8V→1.2V and the clock frequency changes like 400 MHz→100 MHz→400 MHz. Due to this, compared to an LSI to which DVFS has not yet been applied, it is learned that at the low load mode (mode=1), it is possible to reduce the power consumption by about 33%.

FIG. 2A to 2D are diagrams for explaining one example of a semiconductor device which realizes DVFS control and illustrates control of an internal circuit (circuit A). Here, FIG. 2A and FIG. 2B illustrate an example of an LSI to which DVFS has not yet been applied (supply voltage of 1.2V), while FIG. 2C and FIG. 2D illustrate an example of an LSI to which DVFS has finished being applied.

Note that, in FIG. 2B and FIG. 2D, the load modes of the above-mentioned FIG. 1B and FIG. 1D are applied as the load modes of the circuit A.

First, as illustrated in FIG. 2A, an LSI 101 to which DVFS has not yet been applied has internal circuits A and B and a PMU (power management unit) 111. Here, the circuit A operates by a 0 to 400 MHz clock, while the circuit B operates by a 0 to 200 MHz clock.

The PMU 111 distributes clocks with frequencies which change in accordance with the load mode (mode) to the circuits A and B. As illustrated in FIG. 2B, an LSI 101 to which DVFS has not yet been applied is designed to change the frequency of the circuit A in accordance with the load mode so as to reduce the power consumption.

On the other hand, as illustrated in FIG. 2C, an LSI 201 to which DVFS has finished being applied has circuits (internal circuit) A and B, a PMU 211, low drop output regulators (LDO) 212 and 213, and a reference voltage (VREF) generation circuit 214.

The LDO 212 receives a voltage control signal from the PMU 211 and supplies the circuit A with the input 1.2V power source voltage reduced to a voltage in accordance with the load mode (mode). Similarly, the LDO 213 receives a voltage control signal from the PMU 211 and supplies the circuit B with the input 1.2V power source voltage reduced to a voltage in accordance with the load mode.

Note that, the PMU 211, like the above-mentioned PMU 111, distributes clocks with frequencies which change in accordance with the load mode to the circuits A and B.

Due to this, as illustrated in FIG. 2D, due to the load mode of the circuit A, the clock frequency of the circuit A changes like 400 MHz→100 MHz→400 MHz and the supply voltage to the circuit A changes like 1.2V→0.8V→1.2V.

As a result, compared to an LSI to which DVFS has not yet been applied, it is learned that in the low load mode (mode=1) of the circuit A, it is possible to reduce the power consumption by about 33%. Note that, the VREF generation circuit 214 is a circuit for generating a reference voltage VREF which is used for controlling the voltage values of the supply voltages which are output from the LDOs 212 and 213.

In this way, the LSI 201 which is illustrated in FIG. 2C is designed to mount the regulators (LDOs) 212 and 213 inside the LSI, uses a single power source voltage from the outside (for example, 1.2V) to generate various voltages inside the LSI, and supplies predetermined voltages to the circuits A and B.

That is, when desiring to make the circuit A lower in power consumption by the DVFS technique, the minimum extent of clock frequency by which the circuit A may handle a load in accordance with the load mode (mode) is assigned for each load mode (mode=0 to 3) as in FIG. 1C.

Furthermore, at the minimum extent of supply voltage at which the circuit A may operate at all clock frequencies, furthermore the voltage value of the supply voltage is allocated for each load mode as in FIG. 1C.

That is, an LSI 201 to which DVFS has finished being applied reduces the overall power consumption in accordance with the change of the load state of the circuit A (modes=0 to 3), so sets both the clock frequency and supply voltage in combination in accordance with each load mode.

This combination becomes a combination in which, inevitably, the higher the clock frequency, the higher the supply voltage and in which the lower the clock frequency, the lower the supply voltage. In the case of no load, it is also possible to stop the clock (0 MHz) and cut off the supply of power.

Further, as explained with reference to FIG. 2D, when the load state which is applied to the circuit A changes like the mode=3→1→3, by setting the clock frequency and supply voltage to the combination allocated for each mode each time, it is possible to lower the overall power consumption.

Figure 3B:
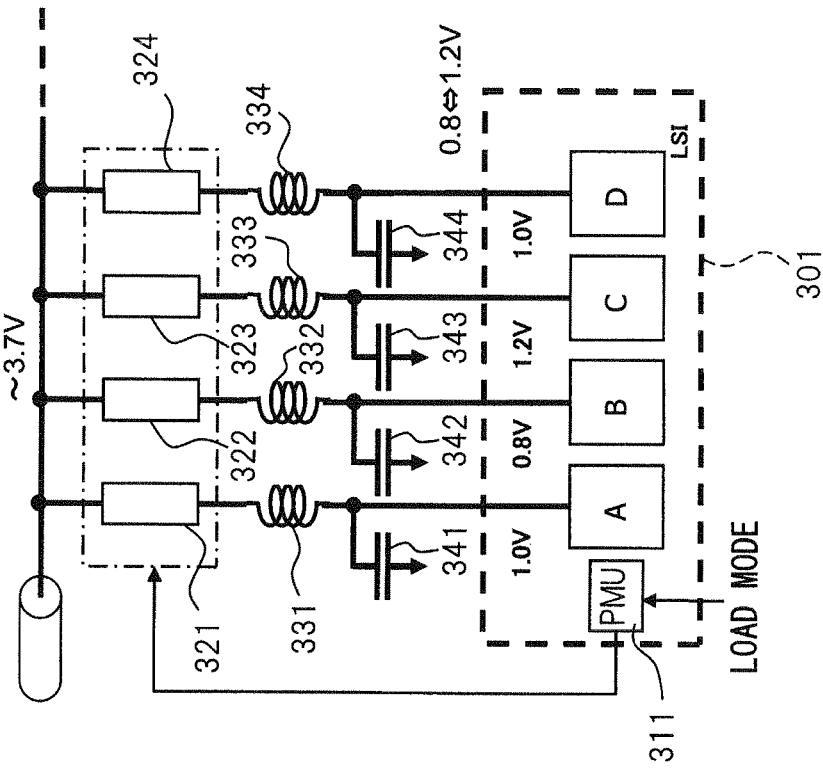

FIG. 3A and FIG. 3B are diagrams for explaining the issues in a semiconductor device (LSI) which realizes DVFS control, wherein FIG. 3A illustrates an LSI in which the supply voltages are controlled by DC-DC converters, while FIG. 3B illustrates an LSI in which the supply voltages are controlled by internal LDOs.

First, in FIG. 3A, reference notation 301 indicates an LSI, A to D indicate internal circuits, 311 indicates a PMU, 321 to 324 indicate DC-DC converters (external power circuits), 331 to 334 indicate inductors, and 341 to 344 indicate capacitors. Here, the circuits A to D, for example, correspond to a four-multicore DSP (digital signal processor).

The LSI 301 of FIG. 3A is designed to supply the circuits A to D with voltages (supply voltages) from the dedicated DC-DC converters 321 to 324. Note that, the DC-DC converters 321 to 324 are respectively provided with inductors 331 to 334 and capacitors 341 to 344 and other power components.

Here, the DC-DC converters 321 to 324 are, for example, supplied with the 3.7V system power source voltage, respectively generate 1.0V, 0.8V, 1.2V, and 1.0V supply voltages, and supply them to the corresponding circuits A to D.

The LSI 301 which is illustrated in this FIG. 3A provides the internal circuits A to D with the DC-DC converters 321 to 324 for changing the supply voltages and thereby may increase the effect of reduction of the power consumption when applying the DVFS technique.

However, in the LSI 301 of FIG. 3A, it may be used to provide DC-DC converters 321 to 324 for the respective circuits A to D. Furthermore, it may be used to provide inductors 331 to 334 and capacitors 341 to 344 and other power components.

That is, the LSI 301 of FIG. 3A may be lowered in power proportional to the squares of the supply voltages to the circuits and therefore is advantageous in terms of lowering the power consumption. However, it may be used to attach a plurality of external DC-DC converters or power components corresponding to the internal circuits. This leads to a major increase in the occupied area and costs.

Next, in FIG. 3B, reference notation 401 indicates an LSI, A to D internal circuits, 411 a PMU, 420 a DC-DC converter (external power circuit), 430 an inductor, 440 a capacitor, and 451 to 454 LDOs. Here, the circuits A to D, for example, correspond to a four-multicore DSP.

The LSI 401 of FIG. 3B supplies supply voltages to the circuits A to D through the dedicated LDOs 451 to 454. Note that, the LDOs 451 to 454, for example, are supplied with the output voltage (power source voltage) of the DC-DC converter 420 which converts the 3.7V system power source voltage to 1.2V.

Note that, the inductor 430 and capacitor 440 are power components for stabilizing the output voltage of the DC-DC converter 420. Further, the LDOs 451 to 454 generate and supply the supply voltages 1.0V, 0.8V, 1.2V, and 1.0V in accordance with the internal circuits A to D.

The LSI 401 of FIG. 3B need only provide the circuits A to D with a single DC-DC converter 420 and power components for the same (inductor 430 and capacitor 440), so is advantageous in terms of the occupied area and costs.

However, the supply voltages for the internal circuits A to D are generated by the LDOs 451 to 454, so the effect of reduction of the power consumption becomes smaller.

That is, if making the power source voltage a single voltage, for example, even in a low load state where almost all internal circuits only use low supply voltages, if there is even one circuit with a high load and a high supply voltage, power will end up being wastefully consumed.

Specifically, the LDOs 451 to 454, for example, when reducing the applied 1.2V power source voltage to the desired voltages (1.0V, 0.8V, and 0V), reduce the voltages by the difference between the power source voltage and the desired voltages, so the predetermined power is wastefully consumed.

In this way, in an LSI to which the DVFS technique has been applied, there is a tradeoff between realization of a lower power consumption and reduction of the occupied area and costs. Due to this tradeoff, for example, in the LSI 401 of FIG. 3B, it is possible to build a system at a low cost, but in return, reduction of the power consumption becomes insufficient.

Figure 4:
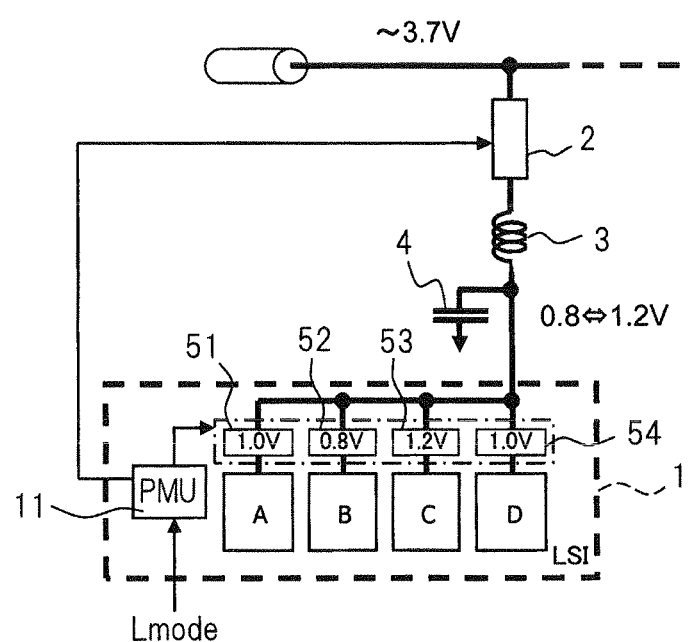
FIG. 4 is a block diagram illustrating a semiconductor device of a first embodiment.

Below, embodiments of a semiconductor device and a signal processing method will be described below with reference to the accompanying drawings. FIG. 4 is a block diagram illustrating a semiconductor device (LSI) of a first embodiment.

In FIG. 4, reference notation 1 indicates an LSI, A to D internal circuits, 11 a PMU (power management unit), 2 a DC-DC converter (external power circuit), 3 an inductor, 4 a capacitor, and 51 to 54 LDOs. Here, the circuits A to D, for example, correspond to a four-multicore DSP.

As will be clear from a comparison of FIG. 4 and FIG. 3B, the LSI 1 of the present first embodiment is designed so that the internal circuits A to D are supplied with supply voltages through respective dedicated LDOs 51 to 54. Note that, the LDOs 51 to 54 are, for example, supplied with the output voltage of the DC-DC converter 2 which converts the 3.7V system power source voltage to a 1.2V power source voltage.

Note that, the inductor 3 and capacitor 4 are power components for stabilizing the output voltage of the DC-DC converter 2. Further, the LDOs 51 to 54 generate and supply the supply voltages 1.0V, 0.8V, 1.2V, and 1.0V corresponding to the internal circuits 11 to 14.

Here, the PMU 11 for example outputs an external power control signal Extcnt to the DC-DC converter 2 through an $I^2C$ bus to control the output voltage (power source voltage) of the DC-DC converter 2.

That is, in the LSI 1 of the present first embodiment, the output voltage of the DC-DC converter 2 is controlled to become the same as the maximum supply voltage of the highest voltage value in the supply voltages which are supplied to the circuits A to D.

In this way, according to the semiconductor device of the present first embodiment, since only one externally provided DC-DC converter is enough, it is possible to reduce the power consumption without inviting a major increase in costs.

Figure 5:
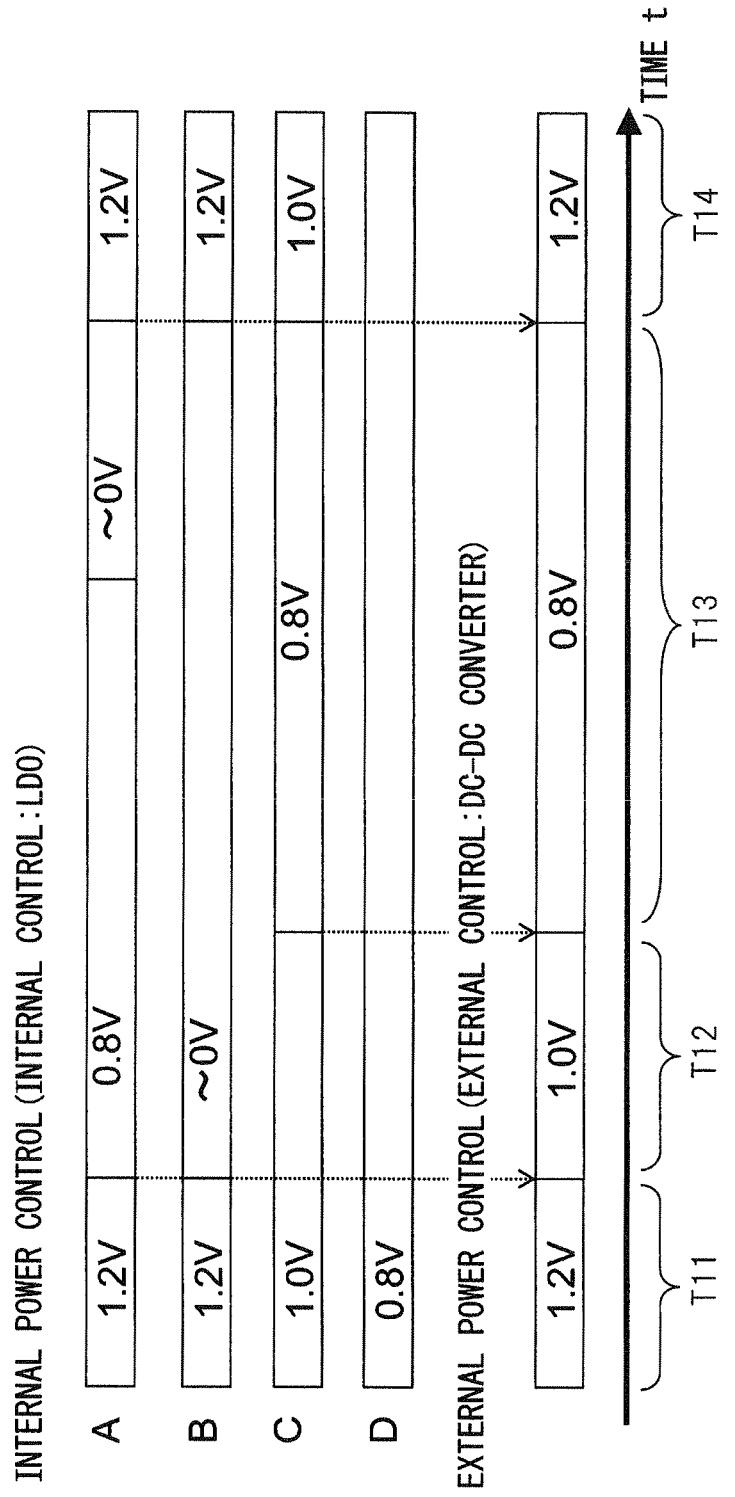
FIG. 5 is a diagram for explaining one example of operation of the semiconductor device which is illustrated in FIG. 4.

FIG. 5 is a diagram for explaining one example of the semiconductor device which is illustrated in FIG. 4 and is for explaining the relationship between internal power control (control of LDOs 51 to 54) and external power control (control of DC-DC converter 2).

In FIG. 5, the abscissa indicates the time t. The changes over time of the voltages (internal power source voltages) which are supplied to the circuit A to circuit D and the changes over time of the output voltage (external power source voltage) of the DC-DC converter 2 are illustrated.

As clear from FIG. 5, the output voltage of the DC-DC converter 2 is controlled so as to become the same as the supply voltage with the highest voltage value at that time (maximum supply voltage). Due to this, power which is wastefully consumed at the LDOs 51 to 54 is reduced.

Specifically, for example, in the time interval T12, the supply voltage of the circuit A becomes 0.8V, the supply voltage of the circuit B becomes 0V, the supply voltage of the circuit C becomes 1.0V, and the supply voltage of the circuit D becomes 0.8V. The highest voltage value is 1.0V. For this reason, in the time interval T12, the output voltage (power source voltage) of the DC-DC converter 2 is controlled to 1.0V.

Due to this, in the time interval T12, the LDOs 51 to 54 generate the supply voltages by reducing the 1.0V power source voltage rather than by reducing the 1.2V power source voltage (output voltage of DC-DC converter 2), so it is possible to reduce the power which is wastefully consumed by the LDOs 51 to 54. Note that, the LDO which supplies the highest supply voltage (1.0V) (53) outputs the applied power source voltage (1.0V) as is as the supply voltage without reducing it.

Further, for example, in the time interval T13, the supply voltage of the circuit A changes from 0.8 to 0V, the supply voltage of the circuit B becomes 0V, the supply voltage of the circuit C becomes 0.8V, and, further, the supply voltage of the circuit D becomes 0.8V. The highest voltage value is 0.8V. For this reason, in the time interval T13, the output voltage of the DC-DC converter 2 is controlled to 0.8V.

Due to this, in the time interval T13, the LDOs 51 to 54 generate the supply voltages by reducing the 0.8V power source voltage rather than by reducing the 1.2V power source voltage, so it is possible to reduce the power which is wastefully consumed by the LDOs 51 to 54. Note that, the LDOs which supply the highest supply voltage (0.8V) (53 and 54) output the applied power source voltage (0.8V) as is as the supply voltage without reducing it.

Further, in the other time intervals T11 and T14, since there is a 1.2V supply voltage, the output voltage of the DC-DC converter 2 is controlled to 1.2V.

In this way, according to the semiconductor device of the present first embodiment, by controlling the voltage value of the power source voltage from the outside and the voltage values of the supply voltages which are supplied from the LDOs, it becomes possible to keep the cost of the system as a whole low while cutting the power consumption more.

Figure 6:
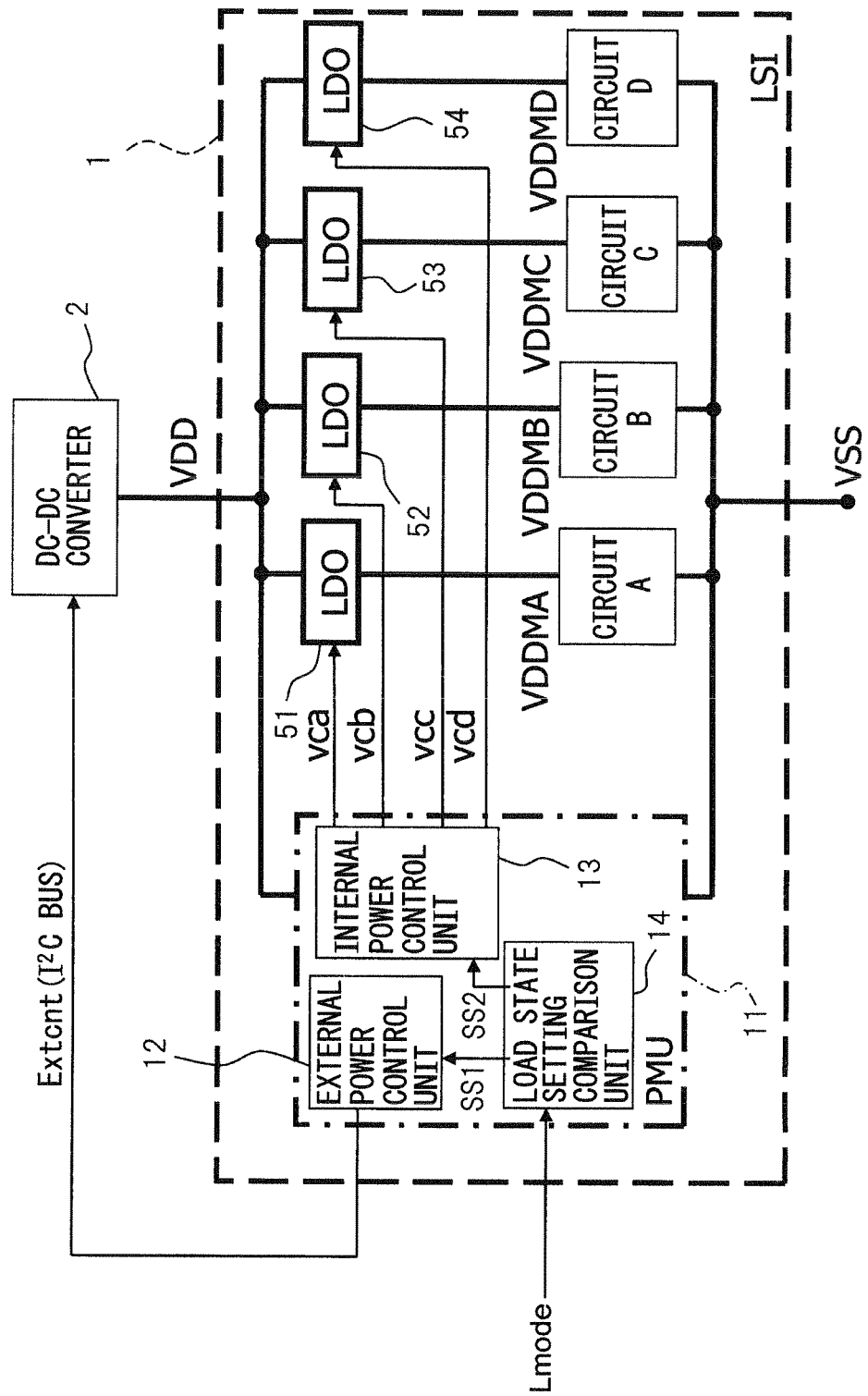
FIG. 6 is a block diagram illustrating the system of a semiconductor device of a second embodiment.

FIG. 6 is a block diagram which illustrates the system of the semiconductor device of the second embodiment. As illustrated in FIG. 6, the PMU 11 has an external power control unit 12, an internal power control unit 13, and a load state setting comparator 14.

The external power control unit 12 receives a signal SS1 from the load state setting comparator 14 and outputs, for example, through the I²C bus, an external power control signal Extcnt to the DC-DC converter (external power circuit) 2 to control the output voltage (power source voltage) VDD of the DC-DC converter 2.

That is, the external power control unit 12, for example, uses the control signal Extcnt of an I²C serial signal to control the output voltage VDD of the DC-DC converter 2 to become the highest voltage value in the supply voltages VDDMA to VDDMD of the internal circuits A to D.

The internal power control unit 13 receives the signal SS2 from the load state setting comparator 14 and outputs the supply voltage control signals (control codes) vca to vcd to the corresponding LDOs 51 to 54 to control the output voltages (supply voltages) VDDMA to VDDMD of the LDOs 51 to 54.

The load state setting comparator 14 receives the load mode signal Lmode, analyzes the load mode state for optimum power source voltage control at each time period, and outputs the signals SS1 and SS2 to the external power control unit 12 and internal power control unit 13.

The LDOs 51 to 54 receive the control codes vca to vcd from the internal power control unit 13 and control the voltage values of the supply voltages VDDMA to VDDMD which are supplied to the internal circuits A to D.

Figure 7:
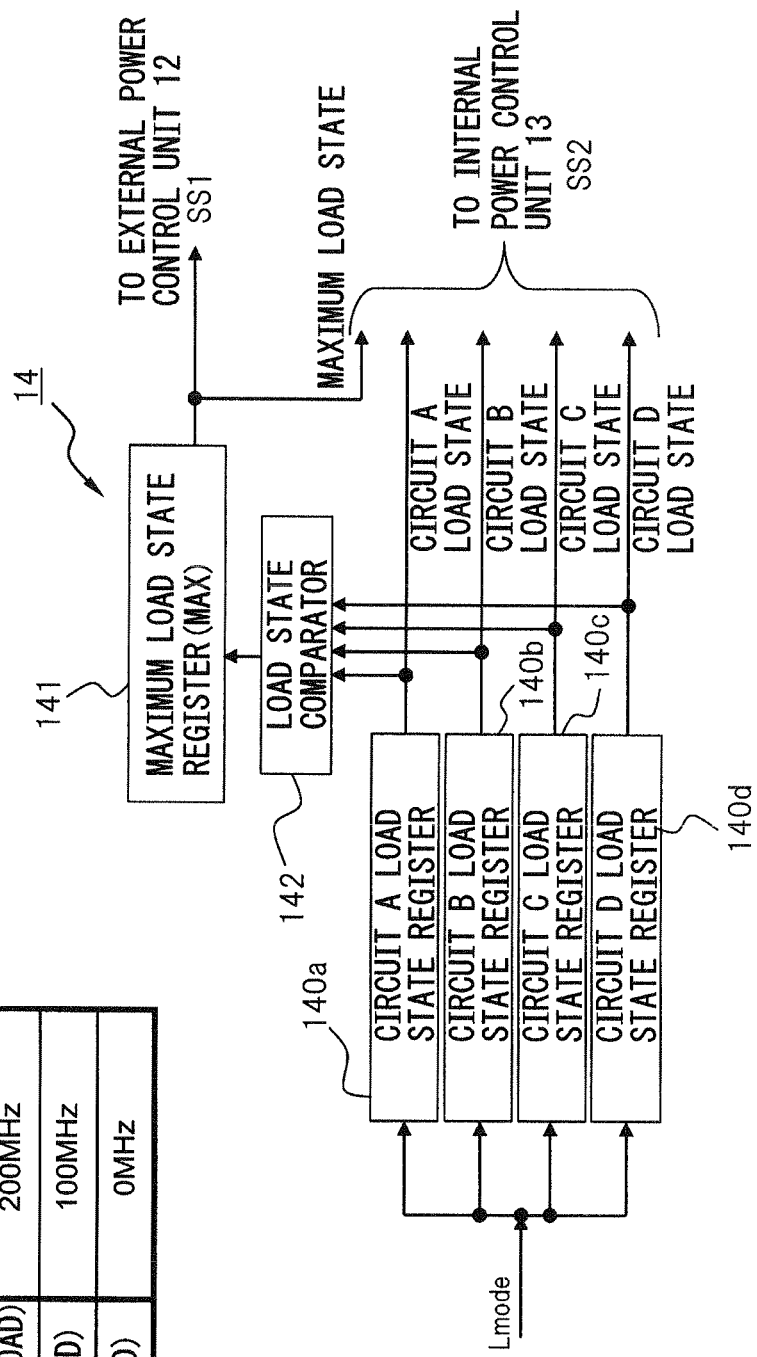
FIG. 7A and FIG. 7B are diagrams for explaining one example of a load state setting comparator in a PMU of the semiconductor device which is illustrated in FIG. 6.

FIG. 7A and FIG. 7B are diagrams for explaining one example of a load state setting comparator in the PMU of the semiconductor device which is illustrated in FIG. 6, wherein FIG. 7A illustrates one example of a load state setting table, while FIG. 7B illustrates one example of a load state setting comparator 14.

As illustrated in FIG. 7A, the load state setting table illustrates the relationship between the value of the load mode signal Lmode and the clock frequency.

That is, when the load mode signal Lmode is "3 (high load)", "2 (medium load)", "1 (low load)", and "0 (no load)", the clock frequency is, for example, respectively set to 400 MHz, 200 MHz, 100 MHz, and 0 MHz.

As illustrated in FIG. 7B, the load state setting comparator 14 has load state setting registers 140a to 140d of the circuits A to D, a load state comparator 142, and a maximum load state (MAX) register 141.

The load state setting registers 140a to 140d store the load states (0 to 3) of the circuits A to D. Further, the load state comparator 142 judges the maximum load state in the load states which are stored in the load state setting registers 140a to 140d. Further, the MAX register 141 stores the maximum load state which was judged by the load state comparator 142.

Here, the value which was stored in the MAX register 141 is output to the external power control unit 12 as the signal SS1. Further, the values which are stored in the load state setting registers 140a to 140d which express the load states of the internal circuits A to D are output together with the value which was stored in the MAX register 141 to the internal power control unit 13 as the signal SS2.

Figure 8:
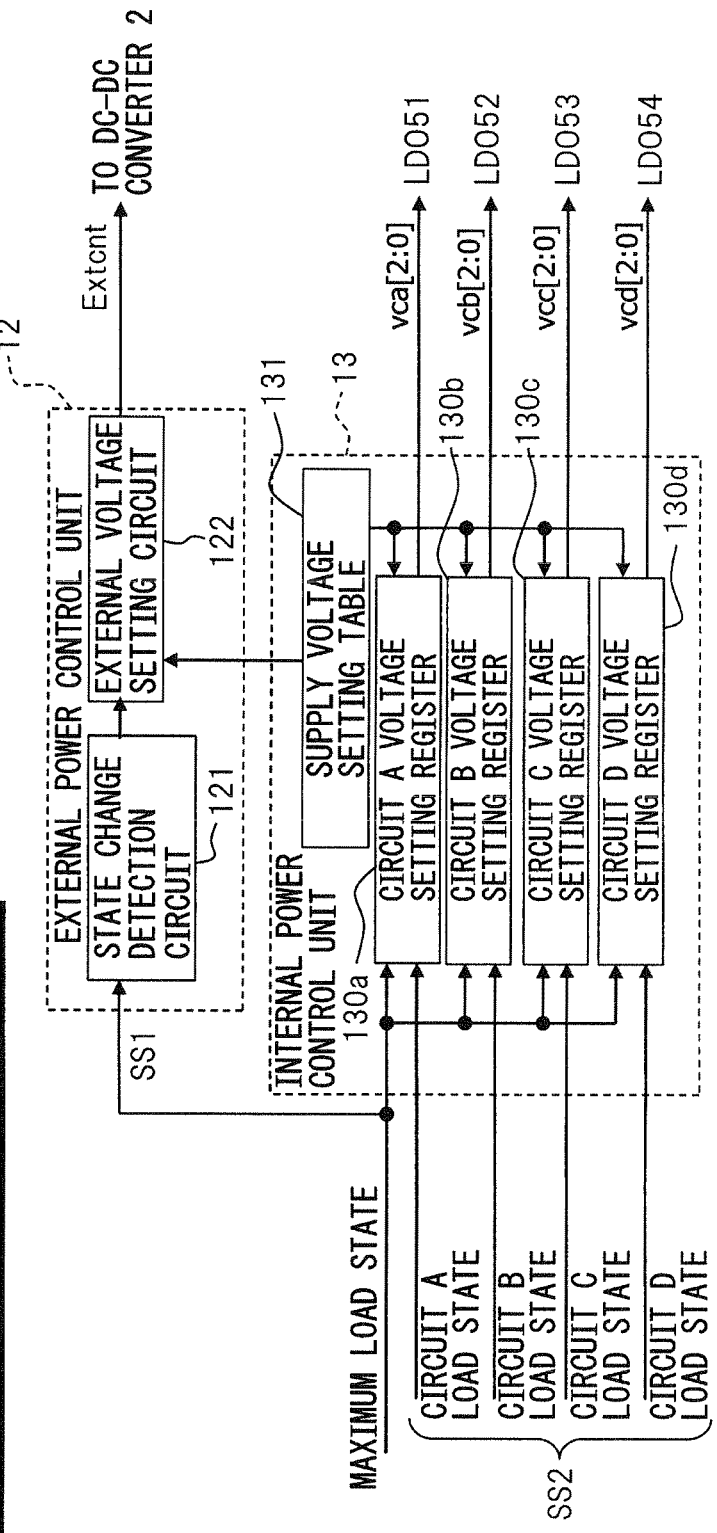
FIG. 8A and FIG. 8B are diagrams for explaining one example of a power control unit in a PMU of the semiconductor device which is illustrated in FIG. 6.

FIG. 8A and FIG. 8B are diagrams for explaining one example of the power control unit in the PMU of the semiconductor device which is illustrated in FIG. 6, wherein FIG. 8A illustrates one example of a supply voltage setting table, while FIG. 8B illustrates one example of an external power control unit 12 and internal power control unit 13.

As illustrated in FIG. 8A, the supply voltage setting table illustrates the relationship of the value of the load mode signal Lmode, the voltage values of the supply voltages VDDMA to VDDMD for the internal circuits A to D and the supply voltage control signals (control codes) vcx (x=a, b, c, d).

That is, when the load mode signal Lmode is "3 (high load)", "2 (medium load)", "1 (low load)", and "0 (no load)", the supply voltages are set to respectively 1.2V, 1.0V, 0.8V, and as low as 0V.

Here, when the supply voltages are set to 1.2V, 1.0V, 0.8V, and down to 0V, the 2-bit control codes vcx are set to "11", "10", "01", and "00". Note that, as explained later, the control codes vcx may also be made 3-bit signals and the most significant bit may be used for control for whether to output the power source voltage VDD from the outside as it is.

As illustrated in FIG. 8B, the external power control unit 12 has a status change detection circuit 121 and an external voltage setting circuit 122. The status change detection circuit 121 receives the signal (maximum load state) SS1 from the MAX register 141 and detects a change in the maximum load state.

Further, the external voltage setting circuit 122 receives the output signal of the status change detection circuit 121 and supply voltage setting table 131 and generates a signal Extcnt (for example, I$^2$C serial signal) to control the output voltage of the DC-DC converter 2.

Further, the DC-DC converter 2, as explained above, receives the control signal Extcnt and outputs the output voltage VDD giving the highest voltage value (maximum supply voltage) among the supply voltages VDDMA to VDDMD of the internal circuits A to D. That is, the DC-DC converter 2 outputs the power source voltage VDD of the voltage value at the time of the maximum load state prescribed in the supply voltage setting table.

The internal power control unit 13 has the voltage setting registers 130a to 130d of the circuits A to D and the supply voltage setting table 131. The voltage setting registers 130a to 130d store the control signals (control codes) vca[2:0] to vcd[2:0] in accordance with the load states of the corresponding circuits A to D.

The control signals vca[2:0] to vcd[2:0] which are stored in the voltage setting registers 130a to 130d are output to the LDOs 51 to 54 which generate the supply voltages VDDMA to VDDMD for the internal circuits A to D and control the voltage values.

Specifically, for example, when the circuit A is set to the medium load (mode=2), this mode is compared with the other circuits B, C, and D. If the mode=2 is not the maximum load state, the control code "010" which is determined in the supply voltage table as the vca[2:0] is output to the LDO 51.

If, the mode=2 is the maximum load state, the code "110" is output as the vca[2:0] to the LDO 51.

That is, the control codes vca to vcd are made 3-bit signals. The lower 2 bits control the voltage values of the supply voltages which are output from the LDOs 51 to 54, while the most significant bit controls whether to output the power source voltage VDD from the outside as it is.

Figure 9:
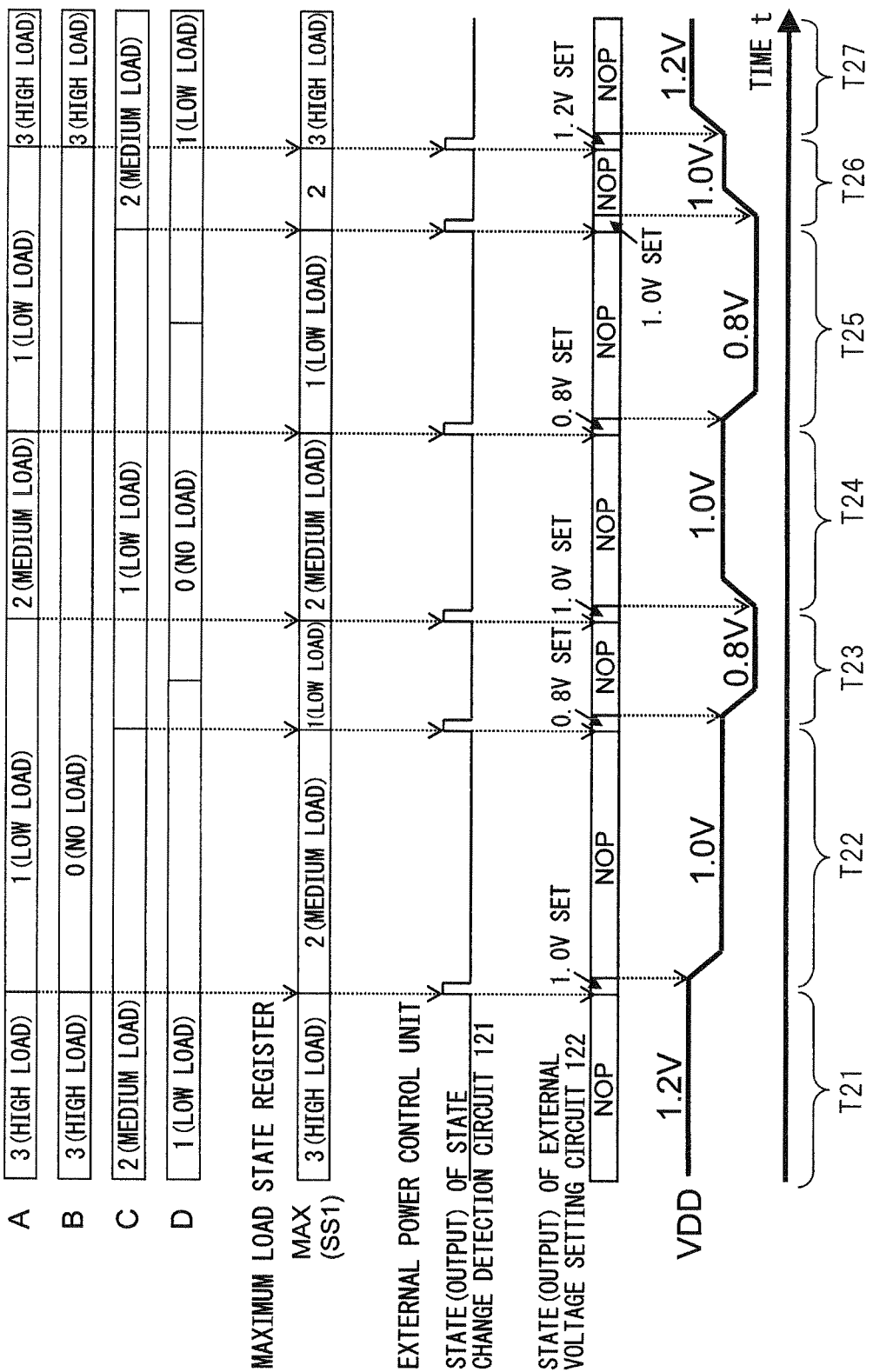
FIG. 9 is a diagram for explaining one example of the operation of a PMU as a whole which is illustrated in FIG. 6 to FIG. 8A and FIG. 8B (part 1)

FIG. 9 and FIG. 10 are diagrams for explaining one example of the operation of the PMU as a whole which is illustrated in FIG. 6 to FIG. 8A and FIG. 8B.

First, the operation of the external power control unit 12 will be explained. FIG. 9 illustrates the load states which are stored at the load state registers 140a to 140d of the circuits A to D, the maximum load state (MAX) which is stored at the maximum load state register 141, and the states (outputs) of the status change detection circuit 121 and external voltage setting circuit 122 at the external power control unit 12.

Here, consider the case where the values of the load state registers 140a to 140d of the internal circuits A to D change like at the top of FIG. 9 (FIG. 10) due to the load mode signal Lmode which is given from outside of the PMU 11.

As illustrated in FIG. 9, in the time intervals T21 to T27, the maximum load states (MAX:SS1) of the circuits A to D changes like "3 (high load)"→"2 (medium load)"→"1 (low load)"→"2 (medium load)"→"1 (low load)"→"2 (medium load)"→"3 (high load)".

Note that, the maximum load state of the circuits A to D, as illustrated in FIG. 7B, is stored in the maximum load state register 141 in the load state setting comparator 14 and is output to the external power control unit 12 as the signal SS1.

As illustrated in FIG. 8B, the status change detection circuit 121 which receives the signal SS1 detects a change of the maximum load state of the circuits A to D and outputs a pulse signal. Receiving this signal, the external voltage setting circuit 122 outputs a control signal Extcnt which expresses the setting voltage after the change in state.

Further, the control signal Extcnt is output to the DC-DC converter 2 which is provided at the outside of the LSI 1 and controls the voltage value of the output voltage (power source voltage) VDD. Note that, in FIG. 9, reference notation NOP indicates the state of non-operation of the external voltage setting circuit 122. During the time interval of this non-operation state, the previous voltage value is maintained for VDD.

That is, as illustrated in FIG. 9, the power source voltage VDD is controlled in the time intervals T21 to T27 to change like 1.2V→1.0V→0.8V→1.0V→0.8V→1.0V→1.2V and become the highest voltage value among the supply voltages of the internal circuits A to D.

Next, the operation of the internal power control unit 13 will be explained. FIG. 10 illustrates the load states which are stored in the load state registers 140a to 140d of the circuits A to D, the maximum load state which is stored in the maximum load state register 141, and the control signals vca[2:0] to vcd[2:0] which are output from the internal power control unit 13.

First, as illustrated in FIG. 7B and FIG. 8B, the output of the maximum load state register 141 and the outputs of the load state registers 140a to 140d of the internal circuits A to D are output as the signal SS2 to the internal power control unit 13.

Further, as illustrated in FIG. 8B, the outputs (control codes) vca[2:0] to vcd[2:0] of the voltage setting registers 130a to 130d of the internal circuits A to D are output to the LDOs 51 to 54 and control the supply voltages VDDMA to VDDMD to the circuits A to D.

That is, as illustrated in FIG. 10, when the values of the load state registers 140a to 140d of the internal circuits A to D change like at the top of FIG. 10 due to the load mode signal Lmode, the lower 2-bit vca[1:0] to vcd[1:0] of the control codes change correspondingly.

Specifically, the lower 2-bit vca[1:0] to vcd[1:0] of the control codes which are output to the LDOs 51 to 54 are set to values corresponding to the load mode signal Lmode of the supply voltage setting table of FIG. 8A.

Further, the highest-bit vca[2] to vcd[2] of the control codes are defined by the relationship between the values of the load state registers 140a to 140d and the output of the maximum load state register 141.

Specifically, the highest-bit vca[2] to vcd[2] of the control codes are set to "1" if the values of the load state registers 140a to 140d and the output of the maximum load state register 141 match, while are set to "0" if they differ.

That is, for the LDO which supplies the highest supply voltage (maximum supply voltage), the highest bit of the control code is made "1" and the power source voltage VDD is output as is as the supply voltage.

FIG. 11A and FIG. 11B are diagrams for explaining one example of the LDO in the semiconductor device which is illustrated in FIG. 6 and illustrates the LDO 51 for the internal circuit A. Note that, the LDOs 52 to 54 are the same as the LDO 51.

Here, FIG. 11A is a block diagram of the LDO 51, while FIG. 11B is a diagram for explaining the operation of a variable voltage division circuit 513 in FIG. 11A.

First, as illustrated in FIG. 11A, the LDO 51 has a decoder 511, differential amplifier 512, variable voltage division circuit 513, and supply transistor (pMOS transistor) 514.

The decoder 511 receives the 3-bit control code (output) vca[0], vca[1], vca[2] from the voltage setting register 130a of the circuit A and outputs signals "disable", lvfix, and sw in accordance with the control code.

The variable voltage division circuit 513, in accordance with the signal sw from the decoder 511, controls the voltage division ratio of the supply voltage VDDMA to the internal circuit A and outputs the voltage (monitor signal) MON-A, which was obtained by dividing the supply voltage VDDMA, to the differential amplifier 512.

The differential amplifier 512 receives the reference voltage signal VREF (for example, 0.6V), the signals "disable" and lvfix from the decoder 511, and the monitor signal MON-A from the variable voltage division circuit 513 and controls the control signal GA of the supply transistor 514.

That is, the differential amplifier 512 controls the control signal which is given to the gate of the supply transistor 514 so as to adjust the supply current which flows through the supply transistor 514 so that the monitor signal MON-A becomes the same potential as the reference voltage signal VREF.

Here, as illustrated in FIG. 11B, (b-1), when, for example, it is desired to set the output voltage (supply voltage to the circuit A) VDDMA to 0.8V at the variable voltage division circuit 513, the signal SW is set to "0".

Due to this, the resistance value of the resistor R1 becomes 25 kΩ, and the resistance value of the resistor R2 becomes 75 kΩ. If the supply voltage VDDMA becomes the targeted 0.8V, feedback control is performed so that the monitor signal MON-A becomes the same 0.6V as the reference voltage signal VREF.

Further, as illustrated in FIG. 11B, (b-2), when, for example, it is desired to set the supply voltage VDDMA to 1.0V at the variable voltage division circuit 513, the signal SW is set to "1".

Due to this, the resistance value of the resistor R1 becomes 40 kΩ, and the resistance value of the resistor R2 becomes 60 kΩ. If the supply voltage VDDMA becomes the targeted 1.0V, feedback control is performed so that the monitor signal MON-A becomes the same 0.6V as the reference voltage signal VREF.

That is, when the monitor signal MON-A is lower than the reference voltage signal VREF, the differential amplifier 512 increases the current of the supply transistor 514 over the consumed current of the circuit A so as to raise the supply voltage VDDMA until MON-A becomes the VREF (0.6V).

Conversely, when the monitor signal MON-A is higher than the reference voltage signal VREF, the differential amplifier 512 reduces the current of the supply transistor 514 from the consumed current of the circuit A so as to lower the supply voltage VDDMA until MON-A becomes VREF (0.6V).

Here, the differential amplifier 512 receives as input the disable signal "disable" and output level fixing signal lvfix from the decoder 511, whereby control is performed corresponding to the supply voltages VDDMA to VDDMD of the LDOs 51 to 54 and the voltage values of the power source voltage VDD.

Specifically, when setting the supply voltage VDDMA from the LDO 51 to 1.0V, for example, the circuit A is not the maximum load state (vca[2]=0), that is, when VDD=1.2V, the differential amplifier 512 is activated (normal LDO mode: sw=1).

Further, for example, when the circuit A is equal to the maximum load state (vca[2]=1), that is, when VDD=1.0V, the differential amplifier 512 is stopped (deactivated) and the supply transistor 514 is forcibly turned on.

Here, the supply transistor 514 is forcibly turned on since the external power source voltage VDD and the voltage value targeted by the supply voltage VDDMA of the circuit A are equal, so the power source voltage VDD is output as is as the supply voltage VDDMA without reduction.

Furthermore, for example, when the circuit A is in a no load state, that is, when VDDMA=0V, the differential amplifier 512 is stopped to forcibly turn off the supply transistor 514 or fix the gate control signal GA to "0".

Here, the supply transistor 514 is forcibly turned off since when the internal circuit A is in the no load state, the circuit A need not be supplied with current, so the supply voltage VDDMA is cut off from the power source voltage VDD so as to eliminate wasteful leakage power etc. Note that, the LDOs 52 to 54 of the other internal circuits B to D are the same as the LDO 51.

Figures 12A, 12B:
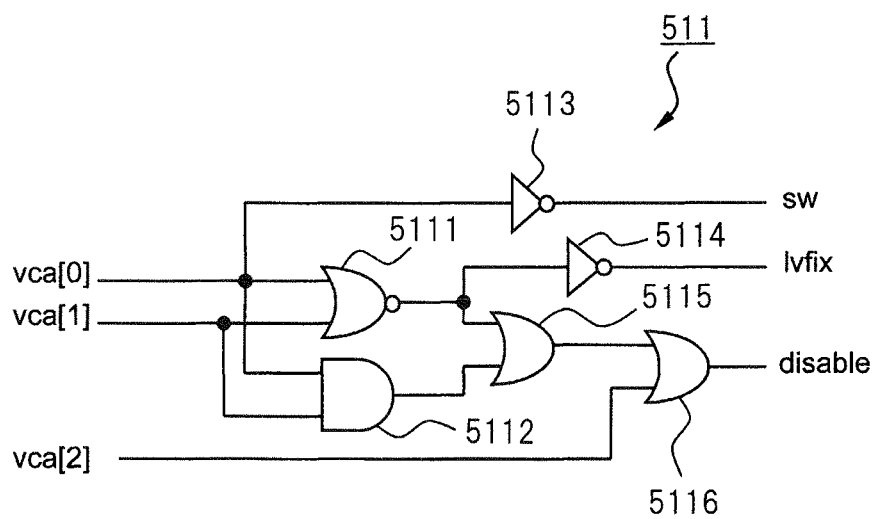
FIG. 12A and FIG. 12B are diagrams for explaining one example of a decoder in the LDO which is illustrated in FIG. 11A and FIG. 11B.

FIG. 12A and FIG. 12B are diagrams for explaining one example of a decoder at the LDO which is illustrated in FIG. 11A and FIG. 11B, wherein FIG. 12A illustrates a truth table of the decoder 511, while FIG. 12B illustrates a circuit of one example of the decoder 511.

As illustrated in FIG. 12B, the decoder 511 has an NOR gate 5111, AND gate 5112, inverters 5113 and 5114, and OR gates 5115 and 5116.

Further, it receives the 3-bit control code vca[0], vca[1], vca[2] from the voltage setting register 130a of the internal circuit A and outputs the selection signal SW, output level fixing signal lvfix, and disable signal "disable" of the truth table which is illustrated in FIG. 12A.

In the truth table of FIG. 12A, the reference notation x indicates a state where either of "0" and "1" is ok ("Don't Care"), while the asterisked vca[0:2]=011 indicates a mode which does not actually exist.

Here, the selection signal SW=0 is the setting of the resistors R1 and R2 at the variable voltage division circuit 513 when the targeted supply voltage VDDMA is 0.8V, while SW=1 is the setting of the resistors R1 and R2 at the variable voltage division circuit 513 when the targeted VDDMA is 1.0V.

Furthermore, the output level fixing signal lvfix=0 is the setting for forcibly turning off the supply transistor 514, while lvfix=1 is the setting for forcibly turning on the supply transistor 514.

Further, the disable signal "disable"="0" is the setting for activating the differential amplifier 512, while "disable"="1" is the setting for stopping (deactivating) the differential amplifier 512. The setting for fixing the output level by the above-mentioned lvfix is effective for the time of setting the stopping of the differential amplifier ("disable"=1).

Figure 13A:
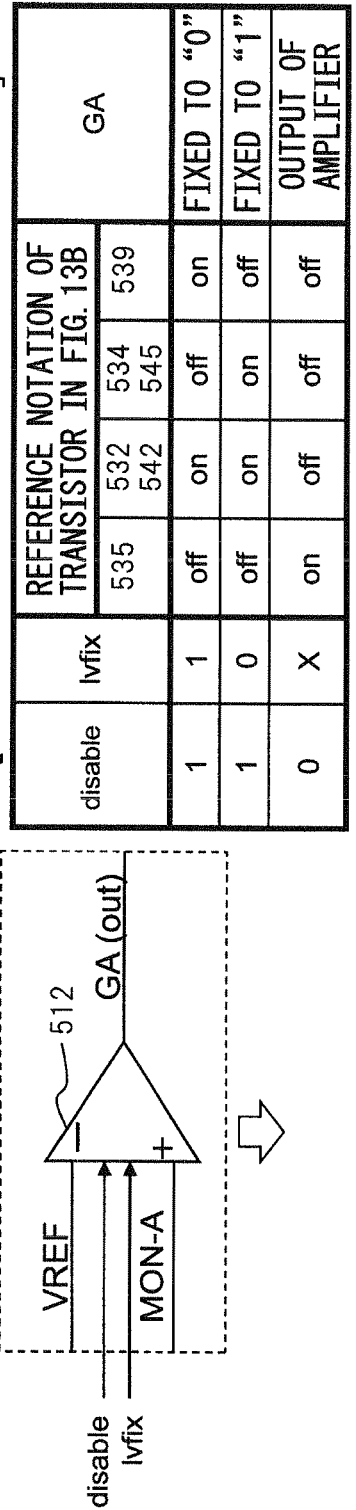
FIG. 13A and FIG. 13B are diagrams for explaining one example of a differential amplifier in the LDO which is illustrated in FIG. 11A and FIG. 11B.
Figure 13B:
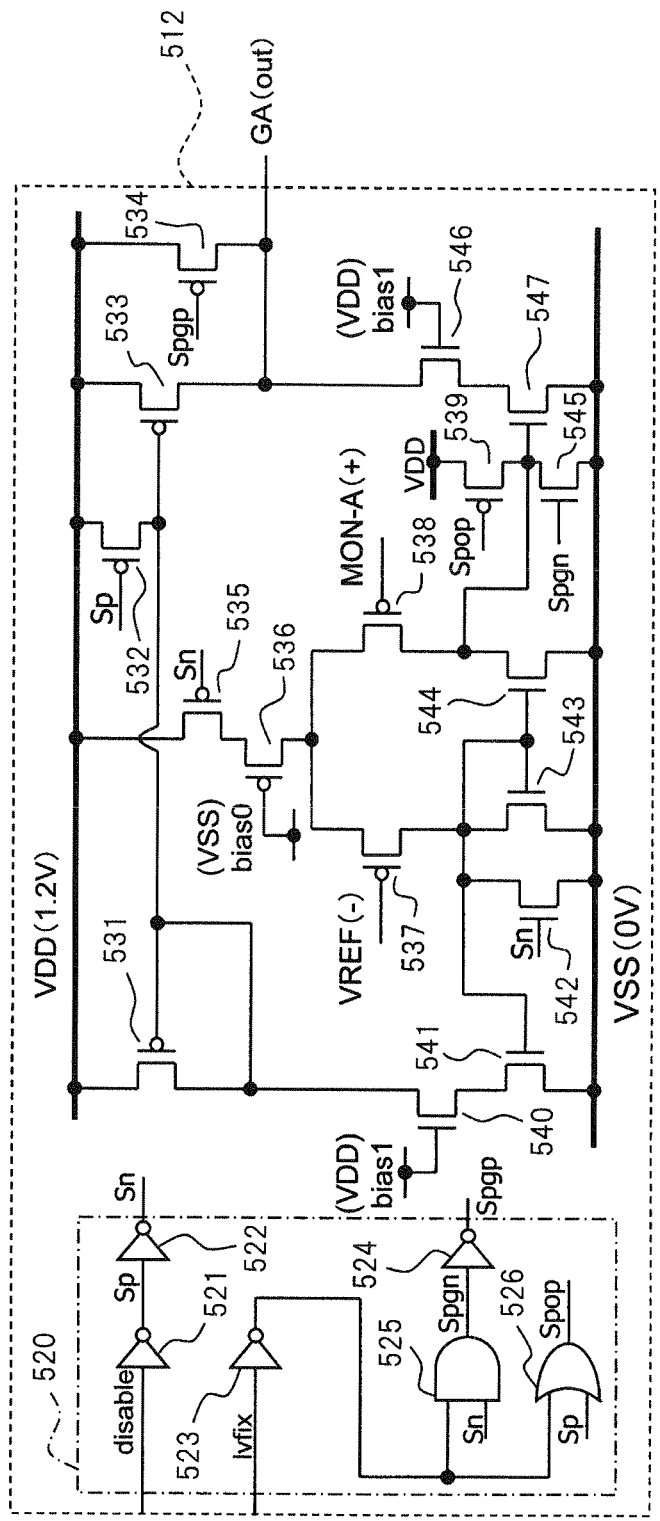

FIG. 13A and FIG. 13B are diagrams for explaining one example of a differential amplifier in the LDO which is illustrated in FIG. 11A and FIG. 11B. Here, FIG. 13A illustrates the signals "disable", lvfix, and GA and the on/off states of the internal control transistors (535; 532 and 542; 534 and 545; and 539) of the differential amplifier 512. Further, FIG. 13B illustrates the specific circuit of one example of the differential amplifier 512.

First, as illustrated in FIG. 13B, the differential amplifier 512 has an internal signal generation circuit 520, pMOS transistors 531 to 539, and nMOS transistors 540 to 547.

The internal signal generation circuit 520 has inverters 521 to 524, an AND gate 525, and an OR gate 526. This internal signal generation circuit 520 receives the disable signal "disable" and output level fixing signal lvfix from the decoder 511 and generates the internal signals Sp, Sn, Spgn, Spgp, and Spop.

As illustrated in FIG. 13B, the internal signal Sp which is generated at the internal signal generation circuit 520 is supplied to the gate of the transistor 532, the signal Sn is supplied to the gate of the transistors 535 and 542, and, further, the signal Spgn is supplied to the gate of the transistor 545.

Furthermore, the internal signal Spgp is supplied to the gate of the transistor 534, while the signal Spop is supplied to the gate of the transistor 539. Further, the reference voltage signal VREF and the monitor signal MON-A of the variable voltage division circuit 513 are supplied to the gates of the differential pair transistors 537 and 538.

Note that, in FIG. 13B, the reference notation "bias0" indicates a fixed low potential power source voltage VSS (0V), while "bias1" indicates a fixed high potential power source voltage VDD (1.2V).

Here, as clear from FIG. 13A, the signal Sn is a signal of the inverted logic of the signal Sp and a signal of the same logic as the disable signal "disable". Further, the signal pgp becomes a signal of the inverted logic of the signal pgn.

FIG. 13A illustrates the on/off operations of the transistors 532, 535, 542, 545, 534, and 539 which are controlled by the internal signals Sp, Sn, Spgn, Spgp, and Spop in the differential amplifier 512 which is illustrated in FIG. 13B.

That is, as illustrated in FIG. 13A, first, when the disable signal "disable" is "0", the transistor 535 turns on, the transistors 532 and 542 turn off, and the differential amplifier 512 is activated. Furthermore, the transistors 534, 545, and 539 for forcibly fixing the gate control signal GA of the supply transistor 514 turn off whereby the normal operating mode (LDO mode) is set. At the time of this normal mode, the differential amplifier operates as a normal amplifier and the value of lvfix is not involved.

On the other hand, when the disable signal "disable" is "1", the transistor 535 turns off, the transistors 532 and 542 turn on, and the differential amplifier 512 is deactivated (stopped). Further, the value of the output level fixing signal lvfix is used to determine whether to forcibly fix the gate control signal GA at "0" or to forcibly fix it at "1".

That is, when the output level fixing signal lvfix=1, the transistors 534 and 545 turn off, the transistor 539 turns on, and the gate control signal GA is forcibly fixed to "0" (low level). Due to this, the supply transistor 514 of the pMOS transistor which is controlled by the signal GA is forcibly made to turn on.

Further, when the output level fixing signal lvfix=0, the transistors 534 and 545 turn on, the transistor 539 turns off, the gate control signal GA is forcibly fixed to "1" (high level), and the supply transistor 514 which is controlled by the signal GA is forcibly turned off.

Note that, the differential amplifier 512 which is illustrated in FIG. 13A and FIG. 13B is just an example. Various ones may be applied needless to say.

Figures 14A, 14B:
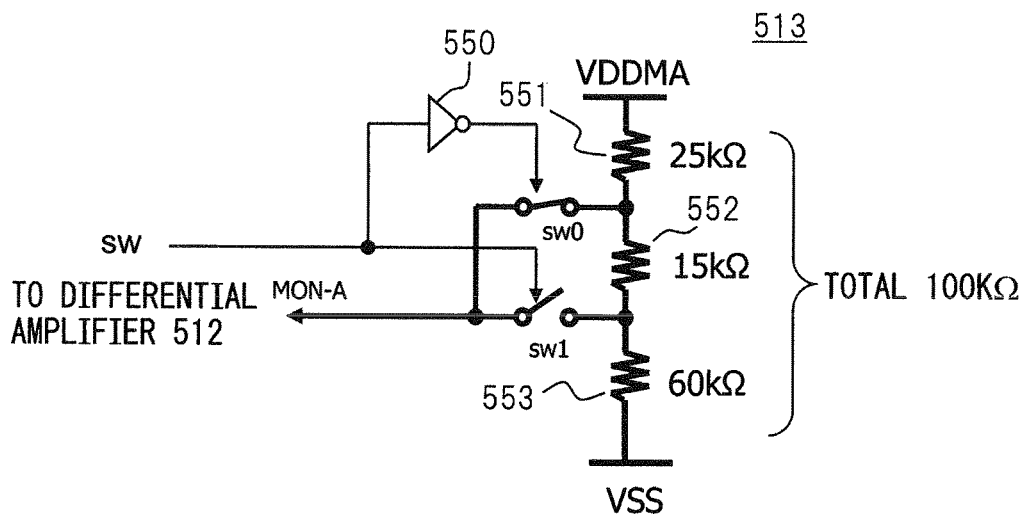
FIG. 14A and FIG. 14B are diagrams for explaining one example of a variable voltage division circuit in the LDO which is illustrated in FIG. 11A and FIG. 11B.

FIG. 14A and FIG. 14B are diagrams for explaining one example of the variable voltage division circuit in the LDO which is illustrated in FIG. 11A and FIG. 11B, wherein FIG. 14A is a circuit diagram which illustrates one example of a variable voltage division circuit 513, and FIG. 14B is a diagram which illustrates the on/off operation of the voltage division ratio switching switches SW1 and SW2.

Note that, in FIG. 14B, *VDDMA illustrates the states where the supply voltage of the internal circuit A is 0.8V and 1.0V, but in each of these cases, the voltage of the monitor signal MON-A is the same 0.6V as the reference voltage VREF.

First, as illustrated in FIG. 14A, the variable voltage division circuit 513 has an inverter 550, resistors 552, 552, and 553, and switches SW0 and SW1.

The switch SW1 is controlled by the selection signal SW, while the switch SW0 is controlled by the signal which is obtained by inverting the signal SW at the inverter 550. Therefore, the switches SW0 and SW1 operate to turn on/off by opposite phases in accordance with the signal SW.

That is, as illustrated in FIG. 14B, when the signal SW=0, the switch SW0 is turned on and the switch SW1 is turned off. Due to this, the monitor signal MON-A is taken out from the connection node of the 25 kΩ by the resistor 551 and the 75 kΩ by the series-connected resistors 552 and 553.

Due to this, when the target supply voltage VDDMA to the internal circuit A is 0.8V, the monitor signal MON-A is set to become 0.6V.

Further, the voltage value of the monitor signal MON-A is made to become 0.6V by control by the differential amplifier 512 and supply transistor 514, so the supply voltage VDDMA is controlled to become 0.8V.

On the other hand, when signal SW=1, the switch SW0 turns off and the switch SW1 turns on. Due to this, the monitor signal MON-A is taken out from the connection node of the 40 kΩ by the serially connected resistors 551 and 552 and the 60 kΩ by the resistor 553.

That is, when the signal SW=0, the voltage division ratio of the resistor which generates the monitor signal MON-A is changed. When the target supply voltage VDDMA to the internal circuit A is 1.0V, the monitor signal MON-A is set to become 0.6V.

Further, the voltage value of the monitor signal MON-A is made to become 0.6V by control by the differential amplifier 512 and supply transistor 514, so the supply voltage VDDMA is controlled to become 1.0V.

That is, the variable voltage division circuit 513 of FIG. 14A may make the supply voltage VDDMA 0.8V by setting the selection signal SW to "0", while may make the supply voltage VDDMA 1.0V by setting the selection signal SW to "1".

Note that, in FIG. 11A and FIG. 11B to FIG. 14A and FIG. 14B, the explanation was given with reference to the example of the LDO 51 for the internal circuit A, but the LDOs 52 to 54 for the internal circuits B to D may be similarly treated.

FIG. 15 to FIG. 17 are diagrams for explaining an example of the operation of the semiconductor device of the second embodiment and focus on the internal operation of the LDO 51 of the internal circuit A.

Here, FIG. 15 illustrates the case where the maximum load state by the circuits other than the circuit A, that is, the circuits B to D, is "3 (high load)", FIG. 16 illustrates the case where it is "2 (medium load)", and FIG. 17 illustrates the case where it is "1 (low load)").

First, as illustrated in FIG. 15, when the maximum load state by the internal circuits B to D is "3 (high load)", that is, when the output (MAX) of the maximum load state register 141 is constantly "3 (high load)", the status change detection circuit 121 maintains the output "0". That is, the status change detection circuit 121 does not output the pulse signal, while the external voltage setting circuit 122 remains in the non-operating state (NOP) and maintains VDD=1.2V.

Therefore, in the time intervals T311 to T315, if the output of the load state register 140a of the circuit A changes like "1"→"0"→"2"→"3"→"1", the control code vca[2:0] changes like 001→000→010→111→001.

Furthermore, the control code vca[2:0] is converted by the decoder 511 to the signals "disable", lvfix, and sw whereby the above-mentioned control is performed. Specifically, for example, in the time interval T312, the disable signal "disable" is "1", the output level fixing signal lvfix becomes "0", and the supply transistor 514 is forcibly turned off.

Further, for example, in the time interval T314, the disable signal "disable" is "1", the output level fixing signal lvfix becomes "1", the supply transistor 514 is forcibly turned on, and the 1.2V power source voltage VDD is output as is as the supply voltage VDDMA from the LDO 51. Note that, in the other time intervals T311, T313, and T315, the LDO 51 operates as an ordinary regulator.

Next, as illustrated in FIG. 16, when the maximum load state by the circuits B to D is "2 (medium load)", the status change detection circuit 121 outputs the pulse signal around the time interval where the load state of the circuit A becomes "3 (high load)". That is, the status change detection circuit 121 outputs a pulse signal at the start of the time intervals T324 and T325.

Further, the external voltage setting circuit 122 outputs the control signal Extcnt which sets 1.2V to the external DC-DC converter 2 in the time interval T324, while outputs the signal Extcnt which sets 1.0V to the DC-DC converter 2 in the time interval T325.

Therefore, in the time intervals T321 to T325, if the output of the load state register 140a of the circuit A changes like "1"→"0"→"2"→"3"→"1", the output (MAX) of the maximum load state register 141 changes like "2"→"2"→"2"→"3"→"2". Furthermore, the control code vca[2:0] changes like 001→000→110→111→001.

Further, for example, in the time interval T322, at the disable signal "disable"=1, the output level fixing signal lvfix becomes "0" and the supply transistor 514 is forcibly turned off.

Further, for example, in the time intervals T323 and T324, the disable signal "disable" is "1", the output level fixing signal lvfix becomes "1", and the supply transistor 514 is forcibly turned on.

Here, in the time interval T323, the 1.0V power source voltage VDD is output as is as the supply voltage VDDMA from the LDO 51, while in the time interval T324, the 1.2V power source voltage VDD is output as is as the supply voltage VDDMA from the LDO 51. Note that, at the other time intervals T321 and T325, the LDO 51 operates as a normal regulator.

Due to this, for example, in the time interval T323, the 1.0V power source voltage VDD is output as is as the supply voltage VDDMA, while in the time intervals T321 and T325, it is possible to generate the supply voltage from the 1.0V power source voltage VDD to reduce the power consumption.

That is, for example, even compared with when using the 1.2V fixed power source voltage VDD to output the supply voltage VDDMA of the internal circuit A in accordance with the individual load states, the power consumption may be reduced.

Furthermore, as illustrated in FIG. 17, when the maximum load state due to the circuits B to D is "1 (low load)", the status change detection circuit 121 outputs a pulse signal around the time interval other than when the load state of the circuit A maintains "1 (low load)" or "0 (no load)". That is, the status change detection circuit 121 outputs a pulse signal at the start of the time intervals T333, T334, and T335.

Further, the external voltage setting circuit 122 outputs the control signal Extcnt which sets 1.0V to the external DC-DC converter 2 in the time interval T333, while outputs the signal Extcnt which sets 1.2V to the DC-DC converter 2 in the time interval T334. Furthermore, the external voltage setting circuit 122 outputs the control signal Extcnt which sets 0.8V to the external DC-DC converter 2 in the time interval T335.

Therefore, in the time intervals T331 to T335, when the output of the load state register 140a of the circuit A changes like "1"→"0"→"2"→"3"→"1", the output (MAX) of the maximum load state register 141 changes like "1"→"1"→"2"→"3"→"1". Furthermore, the control code vca[2:0] changes like 101→000→110→111→101.

Further, for example, in the time interval T332, the disable signal "disable" is "1", the output level fixing signal lvfix becomes "0", and the supply transistor 514 is forcibly turned off.

Further, for example, in the time intervals T331, T333, T334, and T335, the disable signal "disable" is "1", the output level fixing signal lvfix becomes "1", and the supply transistor 514 is forcibly turned on.

Here, in the time intervals T331 and T335, the 0.8V power source voltage VDD is output as is as the supply voltage VDDMA from the LDO 51, while in the time interval T333, the 1.0V power source voltage VDD is output as is as the supply voltage VDDMA from the LDO 51. Furthermore, in the time interval T334, the 1.2V power source voltage VDD is output as is as the supply voltage VDDMA from the LDO 51.

Further, for example, in the time intervals T331 and T335, an 0.8V power source voltage VDD is output as is as the supply voltage VDDMA, while in the time interval T333, a 1.0V power source voltage VDD is output as is as the supply voltage VDDMA.

Due to this, for example, even compared with when using the 1.2V fixed power source voltage VDD to output a supply voltage VDDMA of the internal circuit A corresponding to the individual load states, the power consumption may be reduced. Note that, the same is true for the LDOs 52 to 54 of the circuits B to D other than the circuit A.

In this way, according to the semiconductor device of the present second embodiment, a single DC-DC converter provided at the outside is sufficient, so no great increase in cost is incurred and the power consumption may be reduced.

Figure 18:
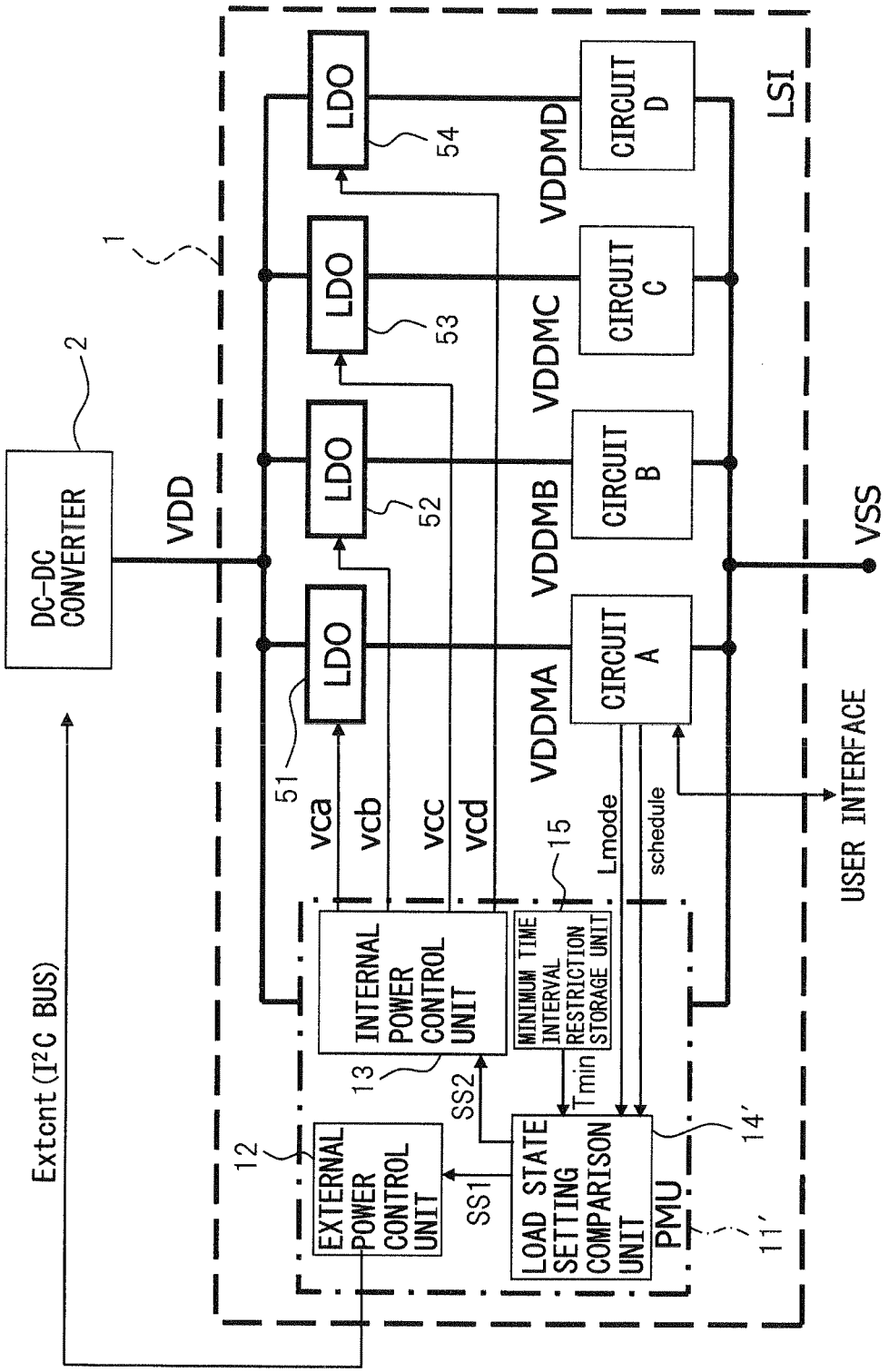
FIG. 18 is a block diagram illustrating the system of a semiconductor device of a third embodiment.
Figure 19:
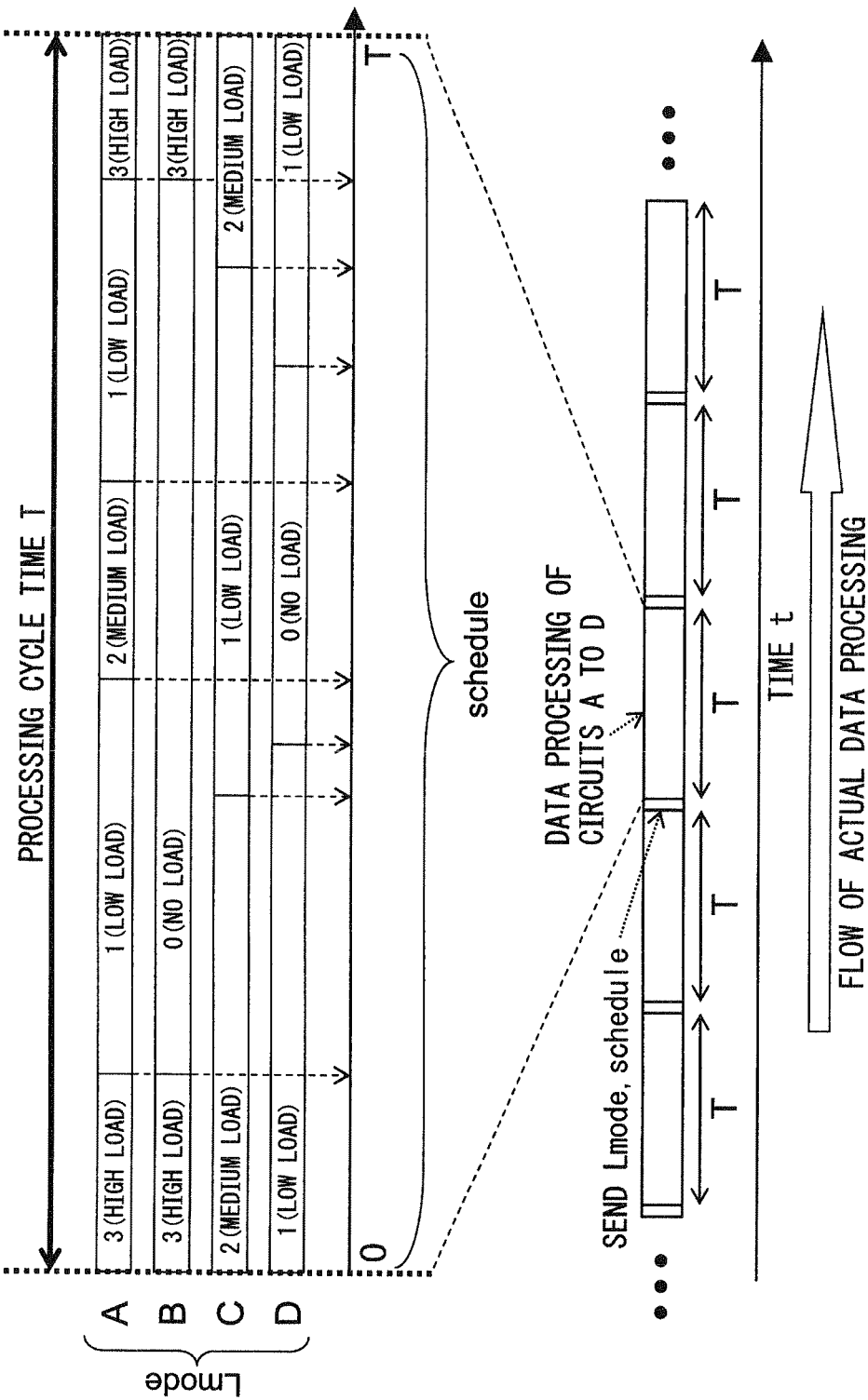
FIG. 19 is a diagram for explaining an example of the settings of a load mode in the semiconductor device which is illustrated in FIG. 18.

FIG. 18 is a block diagram which illustrates the system of the semiconductor device of a third embodiment, while FIG. 19 is a diagram for explaining an example of the settings of the load mode in the semiconductor device which is illustrated in FIG. 18.

First, as clear from a comparison of FIG. 18 and the above-mentioned FIG. 6, the semiconductor device of the present third embodiment does not successively give the load mode signal Lmode from outside of the LSI 1, but, for example, gives it from the internal circuit A.

That is, the circuit A exchanges information with the user interface to analyze the overall amount of work and performs the role of a manager (master) allocating amounts of data processing to the circuits (circuits A to D including the circuit A).

For example, when making the LSI 1 perform predetermined processing corresponding to an application, for example, the load states of the circuits A to D for performing the predetermined processing are sometimes known in advance. In such a case, for example, time-based information on the load states of the circuits A to D is given to the circuit A.

Specifically, for example, the load mode signal Lmode and schedule signal (information) "Schedule" illustrated in FIG. 19 are given to the internal circuit A through the user interface every processing cycle time T.

The circuit A, for example, prepares in advance time-series information (schedule) of the load mode signal Lmode of the circuits A to D such as illustrated in FIG. 19 in units of processing cycle time T and supplies the same to the PMU 11'

(load information setting comparator 14') before the corresponding processing cycle actually starts.

Note that, in the above-mentioned second embodiment which is illustrated in FIG. 6, the role of the internal circuit A in the third embodiment is for example performed by the system microcomputer which is provided outside the LSI 1. That system microcomputer successively supplies the load mode signal Lmode.

Furthermore, in the semiconductor device of the present third embodiment, PMU 11' has a minimum time interval restriction unit 15. This minimum time interval restriction unit 15 limits the power control for the scheduled change in state.

That is, the control of the power source voltage VDD by the DC-DC converter 2 which is provided outside of the LSI 1 is designed to further reduce waste of power consumption by control compared with the minimum time interval Tmin. Note that, details will be explained with reference to FIG. 21A to FIG. 22B, etc.

Note that, for example, it is of course also possible to provide the PMU 11 with the minimum time interval restriction unit 15 in the semiconductor device of the second embodiment which supplies the load mode signal Lmode which is illustrated in the above-mentioned FIG. 6 from the outside.

Figure 20:
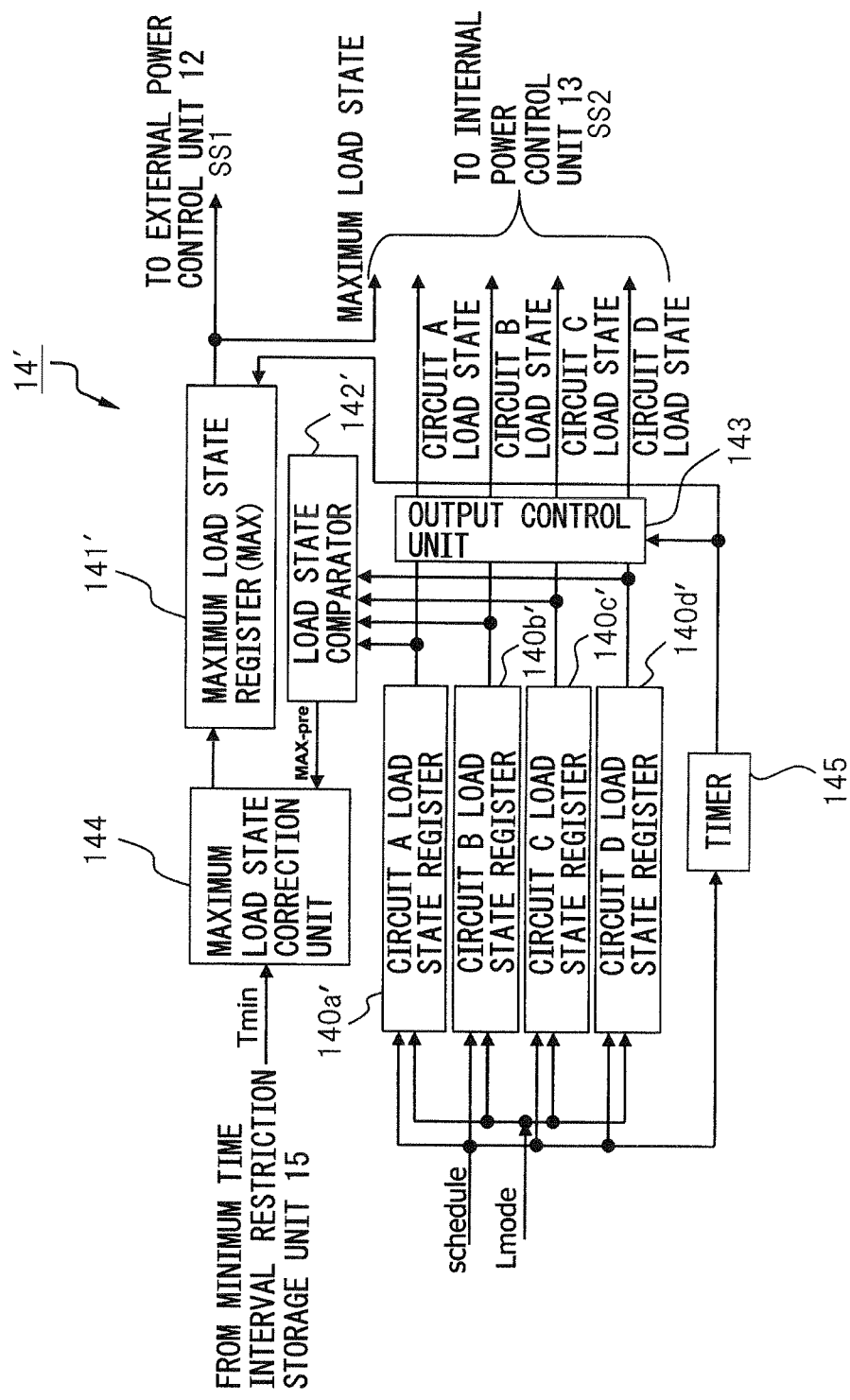
FIG. 20 is a block diagram which illustrates one example of a load state setting comparator in a PMU of the semiconductor device which is illustrated in FIG. 18.

FIG. 20 is a block diagram which illustrates one example of a load state setting comparator 14' in the PMU of the semiconductor device which is illustrated in FIG. 18.

As clear from a comparison of FIG. 20 and the above-mentioned FIG. 7B, the load state setting comparator 14' in the present third embodiment, compared with the load state setting comparator 14 in the second embodiment, further has an output control unit 143, a maximum load state correction unit 144, and a timer 145.

The load state registers 140a' to 140d' of the circuits A to D, as explained above, are supplied with the load mode signal Lmode and schedule signal "Schedule" from the circuit A. That is, the load state registers 140a' to 140d' store the schedules of the load states such as at the top of FIG. 19.

At the outputs of the load state registers 140a' to 140d'°, an output control unit 143 is provided. This outputs the load states of the circuits A to D corresponding to the time information from the timer 145 as the signal SS2 to the internal power control unit 13.

The load state comparator 142' generates schedule information of the maximum load state from the information of the load state registers 140a' to 140d' and outputs it as the signal MAX-pre to the maximum load state correction unit 144.

The maximum load state correction unit 144 receives the minimum time interval information Tmin from a minimum time interval restriction storage unit 15, makes corrections to the signal MAX-pre, and outputs the result to the maximum load state register 141'. The maximum load state register 141' receives the time information from the timer 145, stores it, and outputs the output as the signal SS1 to the external power control unit 12.

Figure 21A:
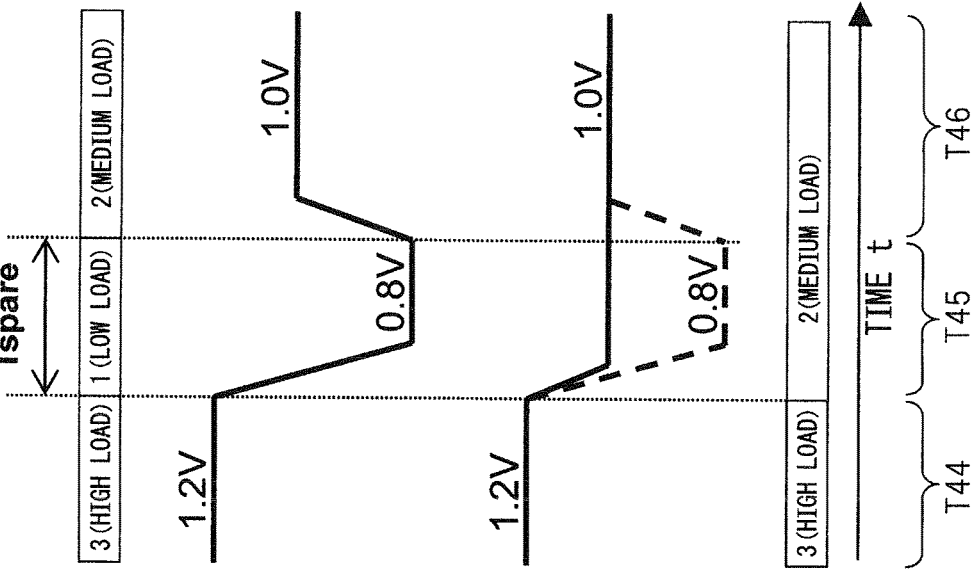
FIG. 21A and FIG. 21B are diagrams for explaining one example of the operation of a maximum load state correction unit in a load state setting comparator which is illustrated in FIG. 20.
Figure 21B:
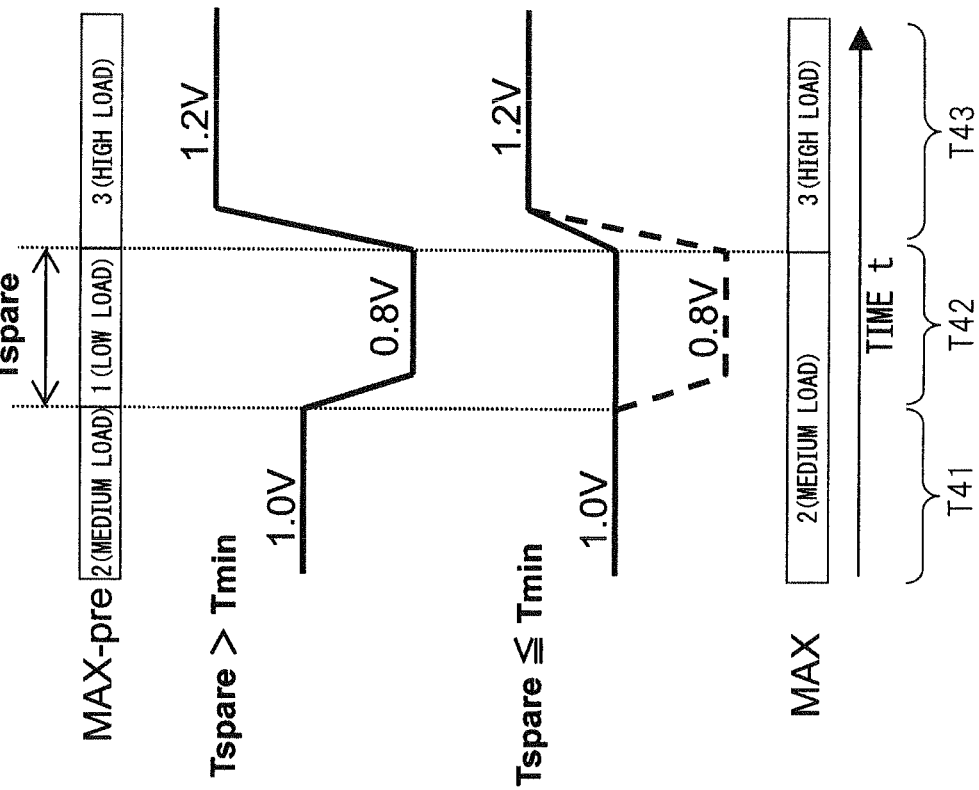

FIG. 21A and FIG. 21B are diagrams for explaining one example of operation of the maximum load state correction unit 144 in the load state setting comparator 14' which is illustrated in FIG. 20.

Here, FIG. 21A illustrates the case where, in the time intervals T41 to T43, the signal (state) MAX-pre changes like "2 (medium load)"→"1 (low load)"→"3 (high load)". Further, FIG. 21B illustrates the case where, in the time intervals T44 to T46, the signal MAX-pre changes like "3 (high load)"→"1 (low load)"→"2 (medium load)".

As illustrated in FIG. 21A and FIG. 21B, when there is a period of time Tspare of a low load state sandwiched between high load states in the signal MAX-pre, the maximum load state correction unit 144 changes the control depending on whether that period of time is longer than the predetermined time interval Tmin.

Specifically, when the period of time Tspare of the low load state sandwiched between high load states is longer than the predetermined time interval (minimum time interval) Tmin (Tspare>Tmin), it executes control of the power source voltage VDD by the external DC-DC converter 2 as is.

That is, when Tspare>Tmin, the maximum load state correction unit 144 outputs the signal MAX-pre from the load state comparator 142' as the maximum load state MAX to the maximum load state register 141' for storage. Due to this, the DC-DC converter 2 is controlled in accordance with the maximum load state MAX (MAX-pre).

On the other hand, when the period of time Tspare of the low load state sandwiched between high load states is longer than the minimum time interval Tmin (Tspare≤Tmin), the DC-DC converter 2 performs control different from normal control.

That is, when Tspare≤Tmin, the maximum load state correction unit 144 corrects the signal MAX-pre from the load state comparator 142' to a signal of the lower load state among the signals corresponding two load states adjacent in time.

Specifically, in FIG. 21A, the time interval T42 (VDD=0.8V) for changing to the load state of "1 (low load)" is controlled so as to maintain the load state (VDD=1.0V) of "2 (medium load)" of the immediately preceding time interval T41.

Further, in FIG. 21B, the time interval T45 (VDD=0.8V) for changing to the load state of "1 (low load)" is controlled so as to change to the load state (VDD=1.0V) of "2 (medium load)" of the immediately preceding time interval T46 at a time interval T45 of an earlier timing than the time interval T46.

Figure 22A:
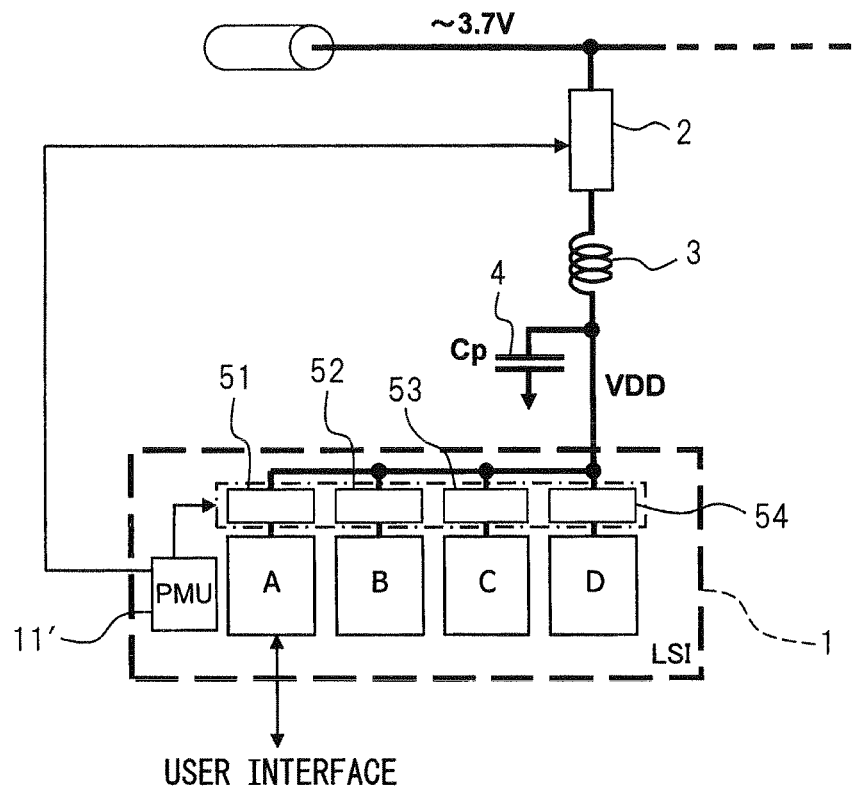
FIG. 22A and FIG. 22B are diagrams for explaining a reduced/lost power due to a voltage drop and voltage rise operation in the semiconductor device of the third embodiment.
Figure 22B:
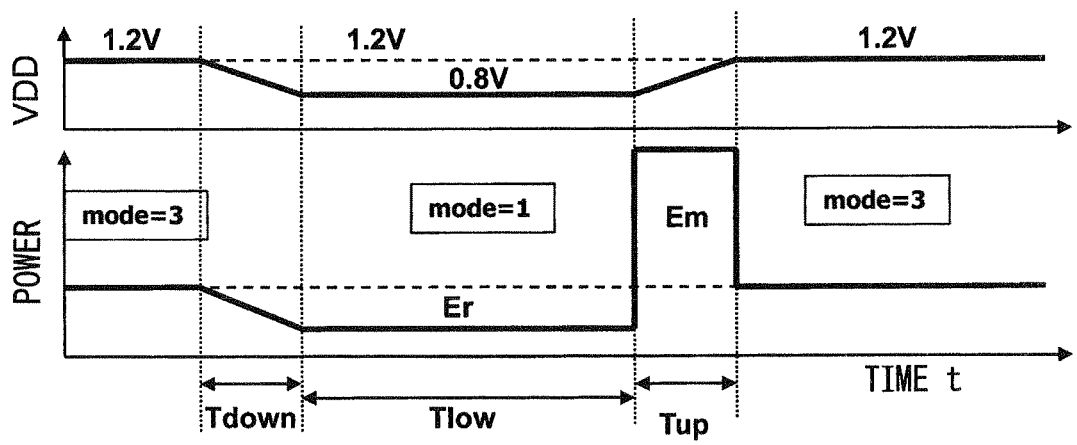

FIGS. 22A and 22B are diagrams for explaining the reduced/lost power due to a voltage drop and voltage boost operation in the semiconductor device of the third embodiment.

Here, FIG. 22A illustrates the LSI 1 of the present third embodiment together with the DC-DC converter 2, inductor 3, and capacitor 4 provided at the outside, while FIG. 22B illustrates the state of power consumption.

Note that, in FIG. 22B, reference notation Er indicates the reduced power made possible by operation while lowering the power source voltage VDD, while Em indicates the lost power (for recharging the capacitor 4) which ends up increasing due to the voltage boost operation of the power source voltage VDD.

That is, for example, when using the DC-DC converter 2 provided at the outside of the LSI 1 to generate the power source voltage VDD, often a large smoothing capacitor (capacitor 3) Cp is mounted for stabilizing the level of the power source voltage.

For this reason, for example, there is energy which is lost (lost power) Em due to the repeated operations for dropping and boosting the power source voltage VDD. The lost power Em per operation is expressed by the following equation 1. Here, V is the difference in voltage value from before reduction and before increase of the power source voltage VDD.

$$Em = Cp * V^2 \quad \text{(equation 1)}$$

Therefore, the lost power Em becomes greater the larger the capacitance Cp of the capacitor 4. Therefore, at the time of an operation for dropping or boosting the power source voltage VDD, there may be an energy gain (reduced power Er:Er>Em) larger than the lost power Em.

That is, when Er<Em, it is preferable power wise to maintain the power source voltage VDD high without reduction. Note that, the reduced power (energy gain) Er corresponds to the gain due to a circuit operation in the state reducing the power source voltage VDD.

This Er is expressed by the following equation 2 using the V which was used for calculation of the above Em, the circuit operation rate α, the circuit load capacity $C_L$, the operating frequency f, and the voltage:

$$Er = \alpha * C_L * f * Tlow * V^2 \quad \text{(equation 2)}$$

For this reason, the condition by which the power is obtained by dropping or boosting the voltage becomes Er>Em, so if using the above-mentioned parameter, the result becomes the following equation 3:

$$Tlow > Cp/(\alpha * C_L * f) \quad \text{(equation 3)}$$

That is, if the time interval (Tlow) at which circuit operation is possible by a reduction in voltage is not $Cp/(\alpha * C_L * f)$ or more, not causing the voltage to drop is advantageous power wise.

Therefore, the maximum state correction unit 144 in the above-mentioned FIG. 20 judges whether the time during which the circuits may be used at a reduced voltage (Tspare in FIG. 21) is sufficient from the viewpoint of the power balance and determines whether to make the DC-DC converter 2 lower the voltage.

For this reason, as the minimum time interval Tmin which is used as the reference for judgment at the maximum state correction unit 144, it is preferable to set the value of $Cp/(\alpha * C_L * f)$ plus the time interval (Tup, Tdown) involved in dropping or boosting the voltage.

Figure 23:
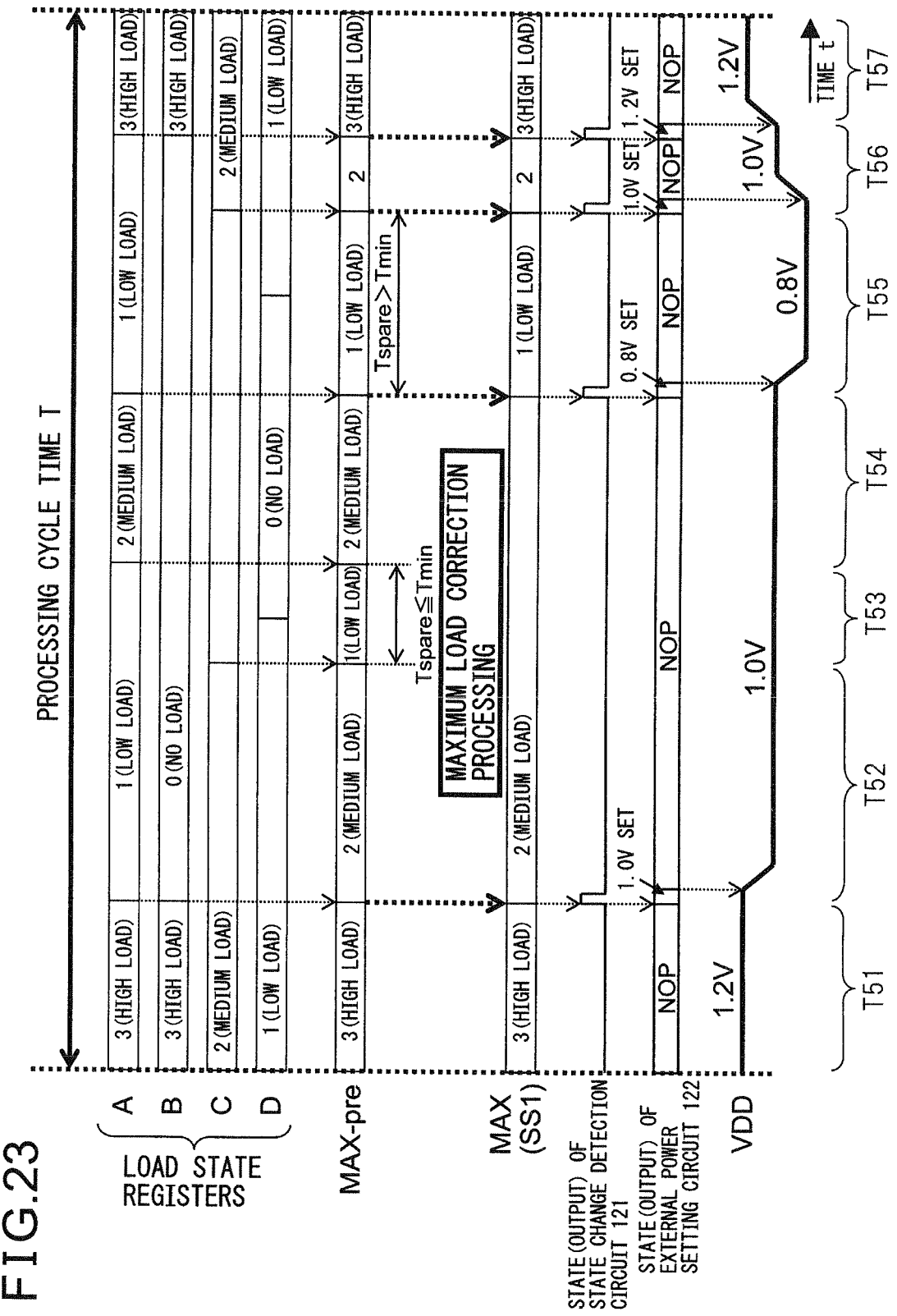
FIG. 23 is a diagram for explaining one example of the operation of the semiconductor device of the third embodiment (part 1)

FIG. 23 and FIG. 24 are diagrams for explaining one example of the operation of the semiconductor device of the third embodiment. Here, FIG. 23 and FIG. 24 correspond to FIG. 9 and FIG. 10 relating to the above-mentioned second embodiment but add control based on the relative magnitude of Tspare and Tmin in the above-mentioned load state of "1 (low load)".

That is, in FIG. 23 and FIG. 24, in the time interval T53 where the load state is "1 (low load)", Tspare≤Tmin, while in the time interval T55 where the load state is "1 (low load)", Tspare>Tmin.

Therefore, the time interval T53 (VDD=0.8V) for changing to the load state of "1 (low load)", since Tspare≤Tmin, is controlled so as to maintain the load state (VDD=1.0V) of the "2 (medium load)" of the immediately preceding time interval T52 (or immediately succeeding time interval T54).

Here, as illustrated in FIG. 23 and FIG. 24, in the time interval T53, the value (maximum load state) MAX which is stored in the maximum load state register 141' is not the signal MAX-pre of the time interval T53, but for example becomes a value the same as the MAX-pre of the immediately preceding time interval T52.

On the other hand, the time interval T55 (VDD=0.8V) for changing to the load state of "1 (low load)", since Tspare>Tmin, is controlled so as to become the load state (VDD=0.8V) of "1 (low load)" as is. That is, the value MAX which is stored in the maximum load state register 141' becomes the value of the signal MAX-pre of that time interval T55.

In this way, according to the semiconductor device of the present third embodiment, the maximum load state correction unit 144 performs maximum load correction processing on the signal MAX-pre from the load state comparator 142' and stores the corrected value in the maximum load state register 141'.

Note that the processing of the external power control unit 12 by the status change detection circuit 121 and the external voltage setting circuit 122 and the processing of the internal power control unit 14 by the voltage setting registers 130a to 130d of the circuits A to D are similar to the processing explained above, so an explanation will be omitted.

That is, for example, the external power control unit 12 and internal power control unit 13 which were explained with reference to FIG. 8A and FIG. 8B and the LDOs 51 to 54 which were explained with reference to FIG. 11A and FIG. 11B to FIG. 14A and FIG. 14B may be applied as they are even to the semiconductor device of the third embodiment which is illustrated in FIG. 18.

In this way, according to the semiconductor device of the present third embodiment, in addition to the above-mentioned semiconductor devices of the first and second embodiments, it is possible to reduce the power consumption more effectively.

Note that, above, the explanation was given with reference to an example of a semiconductor device (LSI) 1 which is provided with four internal circuits A to D which operate at the load states (voltage values of the supply voltage) of "3" to "0", but these may be changed in various ways needless to say.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A semiconductor device comprising:
a plurality of internal circuits;
a plurality of low drop output regulators configured to reduce a power source voltage applied from an outside and generate a plurality of supply voltages which are to be supplied to the plurality of internal circuits; and
a power management unit configured to change a voltage value of the power source voltage in accordance with a state of combination of voltage values of the plurality of supply voltages generated by the plurality of low drop output regulators, wherein
in a case when a time interval during which the voltage value of the power source voltage is kept to a constant voltage value is shorter than a predetermined time interval, and when a loss in terms of power consumption is caused by changing the voltage value of the power source voltage, the power management unit maintains the voltage value of the power source voltage.

2. The semiconductor device as claimed in claim 1, wherein
the low drop output regulators are regulators which supply the supply voltages to corresponding internal circuits and which generate supply voltages of voltage values suitable for load states of the internal circuits in accordance with control signals from the power management unit.

3. The semiconductor device as claimed in claim 1, wherein in a case where it is judged in advance that a first voltage value of the power source voltage in a first time interval is lower than a second voltage value in a second time interval immediately preceding it and a third voltage value in a third time interval immediately succeeding it and when the first time interval is shorter than a predetermined time interval, the power management unit makes the first voltage value match with a lower voltage value between the second voltage value and the third voltage value.

4. The semiconductor device as claimed in claim 3, wherein in a case where the first time interval is longer than the predetermined time interval, the power management unit changes the power source voltage in the first time interval to the first voltage value.

5. The semiconductor device as claimed in claim 3, wherein the predetermined time interval is determined by comparing
a reduced power which is reduced by maintaining the power source voltage of the second voltage value at the first voltage value, and
a lost power which is consumed when changing the power source voltage of the first voltage value to the third voltage value.

6. The semiconductor device as claimed in claim 5, wherein the predetermined time interval is further determined by considering also a time interval for lowering and raising the power source voltage.

7. The semiconductor device as claimed in claim 1, wherein the power management unit receives load modes of the plurality of internal circuits from the outside.

8. The semiconductor device as claimed in claim 1, wherein load modes of the plurality of internal circuits are supplied at each predetermined processing cycle time together with schedule information to a first internal circuit in the plurality of internal circuits, and
the power management unit receives load modes of the plurality of internal circuits and the schedule information from the first internal circuit.

9. The semiconductor device as claimed in claim 1, wherein the power management unit changes the voltage value of the power source voltage in accordance with a maximum supply voltage of a voltage value among the plurality of supply voltages.

10. The semiconductor device as claimed in claim 9, wherein the power source voltage is an output voltage of a DC-DC converter, and
the power management unit controls the DC-DC converter so that the power source voltage becomes a voltage value the same as the maximum supply voltage.

11. The semiconductor device as claimed in claim 10, wherein each of the regulators includes:
a supply transistor, to which the power source voltage is applied, configured to supply a supply voltage to an internal circuit corresponding to that regulator; and
a differential amplifier, which compares a voltage of a monitor signal obtained from the supply voltage with a reference voltage, configured to control the supply transistor.

12. The semiconductor device as claimed in claim 11, wherein the differential amplifier controls a drive current of the supply transistor to become maximum when a supply voltage of the regulator corresponding to that differential amplifier is the maximum supply voltage.

13. The semiconductor device as claimed in claim 12, wherein the power management unit stops an operation at that differential amplifier for comparing the voltage of the monitor signal with the reference voltage when controlling a drive current of the supply transistor to become maximum or to be cut off.

14. The semiconductor device as claimed in claim 11, wherein the differential amplifier controls a drive current of the supply transistor to be cut off when the internal circuit corresponding to the supply transistor controlled by that differential amplifier is in a no load state.

* * * * *